US011986066B2

(12) United States Patent
Zobell et al.

(10) Patent No.: US 11,986,066 B2
(45) Date of Patent: *May 21, 2024

(54) MULTICOLORED FLEXIBLE WEARABLES AND RELATED METHODS

(71) Applicant: Flexible Jewelry LLC, Lehi, UT (US)

(72) Inventors: Brock Zobell, Mapleton, UT (US); Brighton Jones, Sandy, UT (US); Aaron Dalley, American Fork, UT (US)

(73) Assignee: Flexible Jewelry LLC, Lehi, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/810,825

(22) Filed: Jul. 5, 2022

(65) Prior Publication Data

US 2022/0346508 A1 Nov. 3, 2022

Related U.S. Application Data

(63) Continuation of application No. 16/946,013, filed on Jun. 2, 2020, now Pat. No. 11,375,781, which is a
(Continued)

(51) Int. Cl.
A44C 9/00 (2006.01)
A44C 5/00 (2006.01)
(Continued)

(52) U.S. Cl.
CPC ............ *A44C 27/002* (2013.01); *A44C 5/00* (2013.01); *A44C 9/00* (2013.01); *A44C 15/009* (2013.01);
(Continued)

(58) Field of Classification Search
CPC .......... A44C 27/002; A44C 5/00; A44C 9/00; A44C 15/009; A44C 27/007;
(Continued)

(56) References Cited

U.S. PATENT DOCUMENTS

D39,049 S 2/1908 Scullin
1,448,465 A 3/1923 Sherman
(Continued)

FOREIGN PATENT DOCUMENTS

CN 102058207 A 5/2011
DE 10307702 A1 9/2004
(Continued)

OTHER PUBLICATIONS

UROKAZ Two-Tone Collection (two silicone pieces removably coupled together), on sale in the U.S. at least as early as Aug. 25, 2016, available online at https://www.amazon.com/Anillos-silicona-estilos-adecuado-flexible/dp/B07DXRQ8TB/ref=sr_1_3?dchild=1&keywords=urokaz&qid=1590022865&sr=8-3&th=1, last visited May 20, 2020. On p. 8 and on the last page consumers discuss fusing or gluing the two pieces together.
(Continued)

*Primary Examiner* — Jack W Lavinder
(74) *Attorney, Agent, or Firm* — Law Office of Paul B. Johnson; Paul B. Johnson

(57) ABSTRACT

Multicolored flexible wearables include a first portion having a first flexible polymer forming a toroid and including colorant(s), an exposed first outer surface, an exposed second outer surface, and a recess in the first outer surface not reaching the second outer surface. A second portion formed of a second flexible polymer fills a majority of the recess and includes colorant(s). The first and second flexible polymers have different colors and are permanently bonded together. Precious material particles may be disposed within the first and/or second flexible polymers. One or more of the colorants may have a color matching a color of the precious material particles. One method of bonding the portions includes depositing a liquid second portion into the recess and then curing it. Another method includes depositing a
(Continued)

solid second portion into the recess and then curing a liquid layer of polymer between the first portion and second portion.

5 Claims, 15 Drawing Sheets

Related U.S. Application Data continuation-in-part of application No. 16/219,956, filed on Dec. 14, 2018, now Pat. No. 10,687,593, which is a continuation-in-part of application No. 15/706,574, filed on Sep. 15, 2017, now Pat. No. 10,349,709.

(60) Provisional application No. 62/396,962, filed on Sep. 20, 2016.

(51) Int. Cl.
| | |
|---|---|
| A44C 15/00 | (2006.01) |
| A44C 27/00 | (2006.01) |
| B29C 43/20 | (2006.01) |
| B29K 83/00 | (2006.01) |
| B29K 105/00 | (2006.01) |
| B29K 505/10 | (2006.01) |
| B29K 505/14 | (2006.01) |
| B29L 31/48 | (2006.01) |

(52) U.S. Cl.
CPC .......... *A44C 27/007* (2013.01); *B29C 43/203* (2013.01); *B29K 2083/00* (2013.01); *B29K 2105/0035* (2013.01); *B29K 2505/10* (2013.01); *B29K 2505/14* (2013.01); *B29K 2995/0021* (2013.01); *B29L 2031/4842* (2013.01)

(58) Field of Classification Search
CPC .............. B29C 43/203; B29K 2083/00; B29K 2105/0035; B29K 2505/10; B29K 2505/14; B29K 2995/0021; B29L 2031/4842
See application file for complete search history.

(56) References Cited

U.S. PATENT DOCUMENTS

| | | | |
|---|---|---|---|
| 2,109,609 | A | 3/1938 | Aull |
| 2,615,314 | A | 10/1952 | Axel |
| 3,022,648 | A | 2/1962 | Thaler |
| D199,537 | S | 11/1964 | Sklar |
| 3,214,939 | A | 11/1965 | Monahan |
| 3,360,959 | A | 1/1968 | Schechter et al. |
| 3,460,356 | A | 8/1969 | Lodrini |
| 3,557,571 | A | 1/1971 | De Santo |
| 3,606,767 | A | 9/1971 | Auchere et al. |
| 3,610,488 | A | 10/1971 | Tracy |
| 3,745,788 | A | 7/1973 | Sullivan |
| 3,933,010 | A | 1/1976 | Ulbrich |
| 4,043,145 | A | 8/1977 | Chervin |
| D250,005 | S | 10/1978 | Christoffersen |
| 4,129,999 | A | 12/1978 | Shelton |
| 4,142,382 | A | 3/1979 | Fix et al. |
| 4,197,968 | A | 4/1980 | Ullmann et al. |
| 4,224,728 | A | 9/1980 | Paolino |
| D273,942 | S | 5/1984 | Brueck et al. |
| 4,569,211 | A | 2/1986 | Lodrini |
| 4,713,947 | A | 12/1987 | Collins et al. |
| 4,781,705 | A | 11/1988 | Shepherd et al. |
| 4,855,972 | A | 8/1989 | Eiss |
| 4,903,507 | A | 2/1990 | Gesensway |
| 5,129,851 | A | 7/1992 | Villanueva |
| 5,239,842 | A | 8/1993 | Gesensway |
| 5,253,491 | A | 10/1993 | Buontempo et al. |
| 5,261,256 | A | 11/1993 | Ellenbecker et al. |
| 5,456,095 | A | 10/1995 | Tawil et al. |
| 5,483,808 | A | 1/1996 | Barbazza |
| 5,520,016 | A | 5/1996 | Liu |
| 5,628,208 | A | 5/1997 | Rood |
| 5,792,175 | A | 8/1998 | Yoo |
| 6,370,913 | B1 | 4/2002 | Voeltzel et al. |
| 6,481,244 | B1 | 11/2002 | Wright |
| 6,546,749 | B1 | 4/2003 | Canty |
| 6,560,993 | B1 | 5/2003 | Bosque et al. |
| 6,672,105 | B1 | 1/2004 | Sills |
| 6,701,618 | B2 | 3/2004 | Gefen |
| 6,748,764 | B1 | 6/2004 | Roemer |
| 6,928,734 | B1 | 8/2005 | West |
| D515,965 | S | 2/2006 | D'Annunzio |
| D516,451 | S | 3/2006 | D'Annunzio |
| D518,749 | S | 4/2006 | D'Annunzio |
| D522,902 | S | 6/2006 | Kaplan |
| 7,150,164 | B2 | 12/2006 | Sills |
| 7,350,377 | B2 | 4/2008 | Kaplan |
| 7,357,004 | B2 | 4/2008 | Winston et al. |
| 7,430,879 | B2 | 10/2008 | Czajka et al. |
| 7,845,191 | B2 | 12/2010 | Czajka et al. |
| 7,861,554 | B2 | 1/2011 | Czajka et al. |
| D666,362 | S | 8/2012 | Hsu |
| 8,245,533 | B2 | 8/2012 | Avneri-Katzir et al. |
| D750,994 | S | 3/2016 | Baker et al. |
| D751,447 | S | 3/2016 | Baker et al. |
| D751,448 | S | 3/2016 | Baker et al. |
| D780,614 | S | 3/2017 | Kaplan |
| D780,615 | S | 3/2017 | Baker et al. |
| D784,182 | S | 4/2017 | Baker et al. |
| D789,231 | S | 6/2017 | Baker et al. |
| D789,232 | S | 6/2017 | Baker et al. |
| D789,233 | S | 6/2017 | Baker et al. |
| D789,234 | S | 6/2017 | Baker et al. |
| D804,349 | S | 12/2017 | Slimane |
| D814,960 | S | 4/2018 | Hadid |
| 9,943,146 | B2 | 4/2018 | Baker et al. |
| 10,349,709 | B2 | 7/2019 | Jones et al. |
| 10,383,411 | B2 | 8/2019 | Goodwin |
| 10,383,412 | B2 | 8/2019 | Goodwin |
| D863,907 | S | 10/2019 | Little |
| 10,635,173 | B2 | 4/2020 | Lim et al. |
| D885,962 | S | 6/2020 | Jones et al. |
| 10,687,593 | B2 | 6/2020 | Jones et al. |
| 10,702,029 | B2 | 7/2020 | Herz |
| 10,736,386 | B1 | 8/2020 | Hutchins et al. |
| D896,679 | S | 9/2020 | Abiri et al. |
| 10,932,533 | B1 | 3/2021 | Goodwin |
| 11,375,781 | B2 | 7/2022 | Zobell et al. |
| 2002/0170314 | A1 | 11/2002 | Konieczny |
| 2004/0020242 | A1 | 2/2004 | West |
| 2004/0134228 | A1 | 7/2004 | Sills |
| 2005/0268653 | A1 | 12/2005 | Kaplan |
| 2006/0048542 | A1 | 3/2006 | Barry |
| 2006/0162380 | A1 | 7/2006 | Czajka et al. |
| 2006/0165850 | A1 | 7/2006 | Woodruff et al. |
| 2006/0277721 | A1 | 12/2006 | Barretta et al. |
| 2007/0137249 | A1 | 6/2007 | Czajka et al. |
| 2007/0137250 | A1 | 6/2007 | Kohl |
| 2008/0163646 | A1 | 7/2008 | Czajka et al. |
| 2008/0168800 | A1 | 7/2008 | Nisguretsky |
| 2008/0173318 | A1 | 7/2008 | Bean |
| 2008/0184738 | A1 | 8/2008 | Smarsh |
| 2009/0044821 | A1 | 2/2009 | Hatala |
| 2011/0289966 | A1 | 12/2011 | Ahrenholtz et al. |
| 2012/0030909 | A1 | 2/2012 | Moore et al. |
| 2013/0091895 | A1 | 4/2013 | Hwang |
| 2013/0133365 | A1 | 5/2013 | Zannella |
| 2014/0083135 | A1 | 3/2014 | Martinez |
| 2014/0116086 | A1 | 5/2014 | Casaccio et al. |
| 2014/0251358 | A1 | 9/2014 | Temple |
| 2015/0282575 | A1 | 10/2015 | Smith |
| 2016/0345692 | A1 | 12/2016 | Baker et al. |
| 2017/0006978 | A1 | 1/2017 | Rosenberg |
| 2017/0027289 | A1 | 2/2017 | Braun |

(56) References Cited

U.S. PATENT DOCUMENTS

| | | |
|---|---|---|
| 2017/0196320 A1 | 7/2017 | Sato et al. |
| 2018/0035768 A1 | 2/2018 | Goodwin |
| 2018/0078010 A1 | 3/2018 | Jones et al. |
| 2018/0201053 A1 | 7/2018 | Graziano |
| 2018/0206604 A1 | 7/2018 | Goodwin |
| 2018/0271233 A9 | 9/2018 | Goodwin |
| 2018/0289117 A1 | 10/2018 | Guirguis |
| 2018/0289118 A1 | 10/2018 | Guirguis |
| 2019/0043281 A1 | 2/2019 | Aman |
| 2019/0116946 A1 | 4/2019 | Jones et al. |
| 2019/0191829 A1 | 6/2019 | Baker et al. |
| 2019/0313749 A1 | 10/2019 | Goodwin |
| 2019/0355191 A1 | 11/2019 | Jones et al. |
| 2020/0077752 A1 | 3/2020 | Junkins |
| 2020/0297083 A1 | 9/2020 | Zobell et al. |
| 2021/0219674 A1 | 7/2021 | Lachyani Abiri et al. |
| 2021/0259371 A1 | 8/2021 | Chaoneng |
| 2021/0345735 A1 | 11/2021 | Goodwin |
| 2023/0145584 A1 | 5/2023 | Goodwin |

FOREIGN PATENT DOCUMENTS

| | | |
|---|---|---|
| JP | 0565214 | 8/1993 |
| JP | 3122653 U | 5/2006 |
| JP | 3183612 U | 5/2013 |
| KR | 1020050076534 A | 7/2005 |
| KR | 200396514 Y1 | 9/2005 |
| KR | 1020090020438 A | 2/2009 |
| WO | WO2010148347 A2 | 12/2010 |

OTHER PUBLICATIONS

"SteriTouch—The Antimicrobial Specialists," published online at steritouch.com at least as early as Sep. 13, 2016, last accessed Sep. 13, 2016.

"Groove Life Groove Silicone Rings," published online at groovelife.co at least as early as Sep. 13, 2016, last accessed Sep. 13, 2016.

"ShinEtsu Silicone: Characteristic properties of Silicone Rubber Compounds," published by ShinEtsu Jun. 2012, last accessed Sep. 13, 2016.

"SteriTouch All you need to know," published by Steritouch at least as early as Sep. 13, 2016, last accessed Sep. 13, 2016.

Microban online product details, published online by Microban at least as early as Sep. 19, 2016, available online at microban.com, last accessed Sep. 20, 2016.

Groove Life Silicone Ring, published online at https://www.kickstarter.com/projects/381304160/groove at least as early as Apr. 30, 2015, available online at https://www.kickstarter.com/projects/381304160/groove, last visited May 25, 2018 (poor quality of image is how the image was published online, the image is also embedded in the below listed non-patent literature, also submitted herewith).

Groove Ring by Peter Goodwin Kickstarter Campaign, published online at https://www.kickstarter.com/projects/381304160/groove at least as early as Dec. 2, 2015, available online at https://www.kickstarter.com/projects/381304160/groove, last visited May 25, 2018.

"Silicone Wedding Bands—A look at three brands," published online Aug. 23, 2018, available online at https://www.ifjco.com/silicone-wedding-bands/, retrieved Jan. 24, 2020.

Silicone rings on sale by Qalo in the U.S. at qalo.com at least as early as Mar. 15, 2015, available online at https://web.archive.org/web/20150315050109/http:/qalo.com/, last visited Apr. 24, 2020.

Groove University College Silicone Rings, published online at least as early as Apr. 11, 2019, available online at https://web.archive.org/web/20190411123315/https://groovelife.com/collections/groove-university-college-silicone-rings, last visited May 19, 2020.

Qalo Thin Line Collection, on sale in the U.S. at least as early as Sep. 19, 2016, available online at https://qalo.com/collections/thin-line-collection, last visited May 19, 2020.

Qalo Strata Ring, on sale in the U.S. at least as early as Mar. 24, 2018, available online at https://qalo.com/products/mens-strata-olive-and-black-whitetail-mount-silicone-ring?variant=19527119601750, last visited May 19, 2020.

BULZI Massaging Comfort Fit Silicone Wedding Ring, for sale on Amazon.com at least as early as Aug. 28, 2015, last visited Aug. 3, 2018, available online at https://www.amazon.com/BULZi-Massaging-Silicone-Comfortable-Flexible/dp/B00ZBQ46UI/ref=sr_1_2?ie=UTF8&qid=1533333654&sr-8-2&keywords=bulzi+ring&dpID=41PKEvYBRwL&preST=_SY300_QL70_&dpSrc=srch.

RinFit Silicone & Metal Wedding Ring for Women, on sale in the U.S. at least as early as Sep. 2, 2020, available at https://www.rinfit.com/products/metal-infinity, retrieved and last visited May 12, 2023.

OURA Ring (appears to disclose a multi-layer ring with an outer layer of a first material and an inner layer of another color of perhaps the same or a different material—see white ring towards the bottom of the page which appears to have a black interior), disclosed at least as early as Aug. 31, 2016, available online at https://web.archive.org/web/20160831190246/https://ouraring.com/, retrieved and last visited Oct. 17, 2023.

MULTICOLORED FLEXIBLE WEARABLES AND RELATED METHODS

CROSS REFERENCE TO RELATED APPLICATIONS

This document is a continuation of U.S. patent application Ser. No. 16/946,013, entitled "Multicolored Flexible Wearables and Related Methods," which was filed on Jun. 2, 2020, naming as first inventor Brock Zobell, which in turn is a continuation-in-part application of U.S. patent application Ser. No. 16/219,956, entitled "Breathable and Expandable Rings," which was filed on Dec. 14, 2018, naming as first inventor Brighton Jones, issued Jun. 23, 2020 as U.S. Pat. No. 10,687,593, which in turn is a continuation-in-part application of U.S. patent application Ser. No. 15/706,574, entitled "Breathable, Expandable, and Antimicrobial Rings," which was filed on Sep. 15, 2017, naming as first inventor Brighton Jones, issued Jul. 16, 2019 as U.S. Pat. No. 10,349,709, which in turn claims the benefit of the filing date of U.S. Provisional Patent Application No. 62/396,962, entitled "Breathable Rings," which was filed on Sep. 20, 2016, naming as first inventor Brighton Jones, the disclosure of each of which is hereby incorporated herein in its entirety by reference.

BACKGROUND

1. Technical Field

Aspects of this document relate generally to rings worn on the digits of users, such as rings worn on fingers and/or toes.

2. Background Art

Rings and bracelets exist in the art in a variety of shapes and sizes. Rings and bracelets are sometimes formed of metallic materials, such as precious metals, and sometimes include gems embedded therein or otherwise attached thereto. Other rings and bracelets are formed of silicone. Rings and bracelets sometimes have meaningful significance. For example, one or more rings may be worn to signify that the wearer is married or is engaged to be married. Some rings and bracelets, however, are worn only for ornamental purposes. Some rings and bracelets include an inscription, lettering, or other design thereon which may or may not include some type of message—for example, the initials of the wearer, or an inspirational message, etc. Rings are commonly worn on the digits of users, such as on fingers or toes. Bracelets are commonly worn on limbs of users, such as around a user's leg near the user's ankle, or on a user's wrist or arm.

SUMMARY

Embodiments of multicolored flexible wearables may include: a first portion having a toroid formed at least in part by a first flexible polymer, the first flexible polymer including: one or more first colorants disposed within the first flexible polymer; an exposed first outer surface; an exposed second outer surface opposite the first outer surface; and a recess in the first outer surface, the recess having a depth perpendicular to the first outer surface, the recess not extending to the second outer surface; and a second portion filling at least a majority of a volume of the recess and at least a majority of the depth of the recess, the second portion having a second flexible polymer, the second flexible polymer including one or more second colorants disposed within the second flexible polymer; wherein the first flexible polymer and the second flexible polymer are permanently bonded together within the recess; and wherein the first flexible polymer has a different color than the second flexible polymer.

Embodiments of multicolored flexible wearables may include one or more or all of the following:

The first flexible polymer and the second flexible polymer may have identical compositions except for one or more different colorants and one or more precious material particles.

The first outer surface may fully circumscribe an opening of the recess.

The recess may form one or more lines at least partially encircling the first portion and/or may form one or more alphanumeric characters.

A surface of the second portion may be exposed on an outside of the multicolored flexible wearable.

The second portion may have a surface most proximate to the first outer surface, and pointing in a same direction as the first outer surface, which is not substantially flush with the first outer surface.

At least one of the first flexible polymer and the second flexible polymer may include a metallic color.

At least one of the first flexible polymer and the second flexible polymer may include a plurality of precious material particles.

The precious material particles may include gold particles, non-ionic silver particles, copper particles, platinum particles, and/or crushed pearl particles.

At least one of the first flexible polymer and the second flexible polymer may include one or more colorants having a color matching a color of the precious material particles, the one or more colorants not including the precious material particles.

A plurality of straight grooves may be formed in the second outer surface and may extend from proximate a top of the first portion to proximate a bottom of the first portion.

Embodiments of methods of forming multicolored flexible wearables may include: forming a toroid including a first portion, the first portion including a first flexible polymer, the first flexible polymer including one or more first colorants; forming a recess in an exposed first outer surface of the toroid, the recess having a depth perpendicular to the first outer surface of the toroid, the recess not extending fully to an exposed second outer surface of the toroid opposite the first outer surface; filling at least a majority of a volume of the recess and at least a majority of the depth of the recess with a second portion, the second portion including a second flexible polymer, the second flexible polymer including one or more second colorants; and permanently bonding the first portion and the second portion together through a curing process; wherein the first flexible polymer includes a different color than the second flexible polymer; and wherein the first portion and the second portion have at least 70% identicality between their compositions.

Embodiments of methods of forming multicolored flexible wearables may include one or more or all of the following:

Forming the recess in the exposed first outer surface may include forming one or more lines at least partially encircling the first portion and/or forming one or more alphanumeric characters.

Forming the recess in the exposed first outer surface may include forming the one or more alphanumeric characters.

Embodiments of multicolored flexible wearables may include: a first portion including a first flexible polymer, the first portion including a toroid, the first portion further including: a recess in an exposed first outer surface of the toroid; and one or more first colorants within the first flexible polymer; a second portion at least partially filling the recess, the second portion including a second flexible polymer, the second portion including one or more second colorants within the second flexible polymer; and a plurality of precious material particles disposed within one of the first flexible polymer and the second flexible polymer; wherein the one or more first colorants do not include the precious material particles; wherein the one or more second colorants do not include the precious material particles; and wherein the one or more first colorants include a color different from a color of the one or more second colorants.

Embodiments of multicolored flexible wearables may include one or more or all of the following:

The one or more first colorants and/or the one or more second colorants may have a color matching a color of the precious material particles.

The precious material particles may be disposed within the first flexible polymer.

A plurality of second precious material particles may be disposed within the second flexible polymer.

The one or more first colorants may include a color matching a color of the precious material particles.

The one or more second colorants may include a color matching a color of the second precious material particles.

The precious material particles may be disposed within the second flexible polymer.

General details of the above-described embodiments, and other embodiments, are given below in the DESCRIPTION, the DRAWINGS, and the CLAIMS.

BRIEF DESCRIPTION OF THE DRAWINGS

Embodiments will be discussed hereafter using reference to the included drawings, briefly described below, wherein like designations refer to like elements, and wherein elements are not necessarily drawn to scale.

DESCRIPTION

Implementations/embodiments disclosed herein (including those not expressly discussed in detail) are not limited to the particular components or procedures described herein. Additional or alternative components, assembly procedures, and/or methods of use consistent with the intended multicolored flexible wearables and related methods may be utilized in any implementation. This may include any materials, components, sub-components, methods, sub-methods, steps, and so forth.

As used herein, the word "digit" when it is used in relation to a user, e.g., the "digit of a user" or the like, is defined as a human finger and/or a human toe.

As used herein, the term "precious metal" is defined as one or more of the following metals: gold, silver, copper, and platinum.

Figure 1:
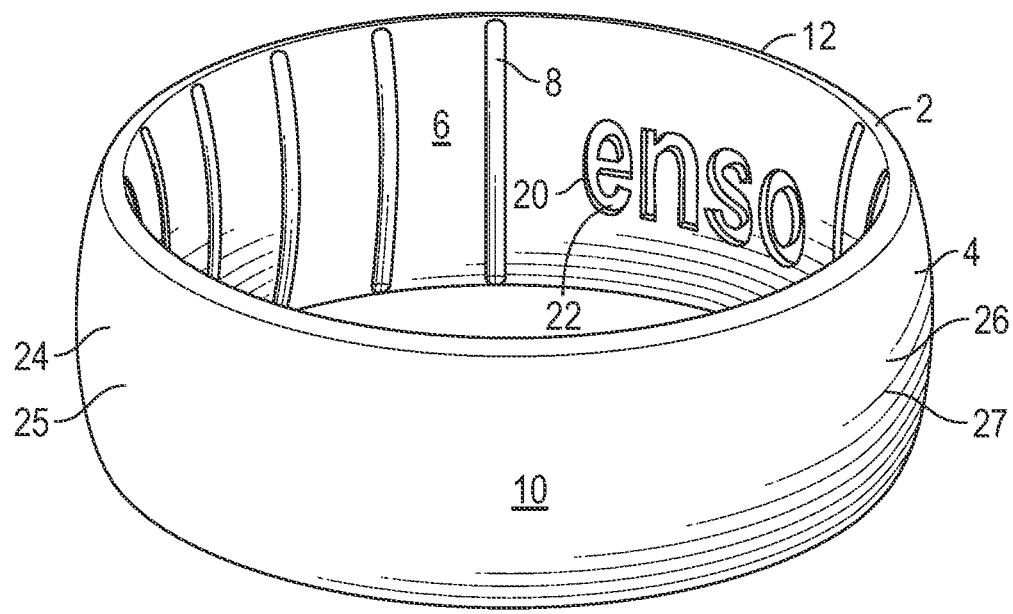
FIG. 1 is a front perspective view of an implementation of a breathable ring.
Figure 2:
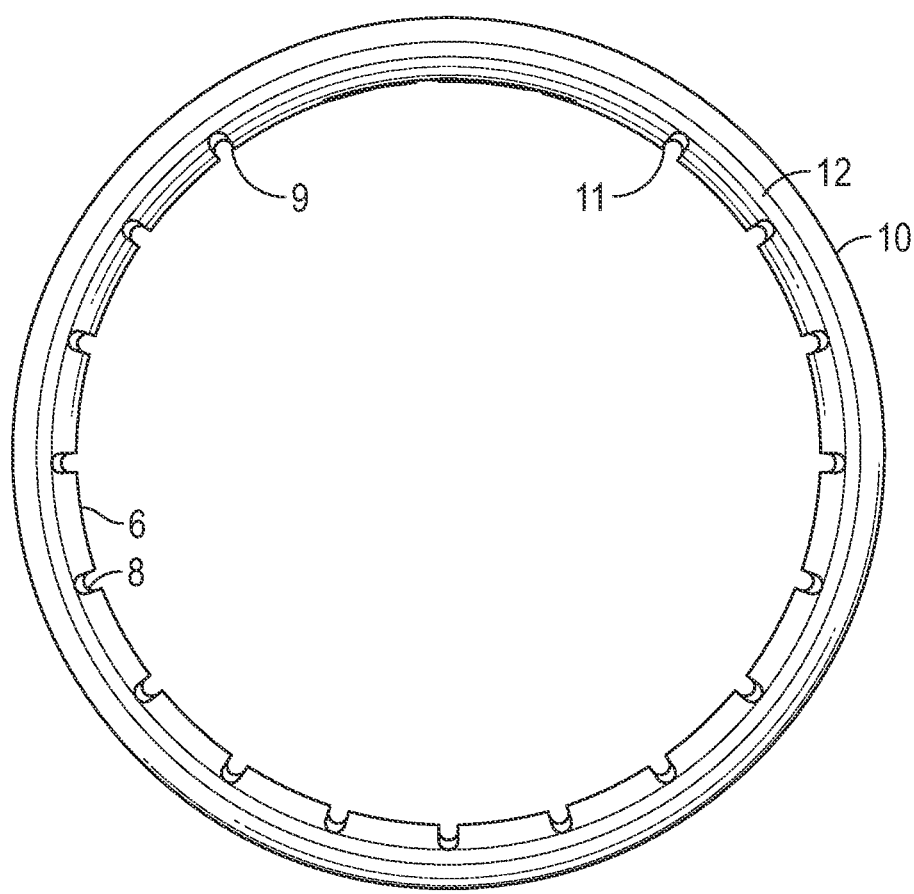
FIG. 2 is a top view of the breathable ring of FIG. 1.
Figure 3:
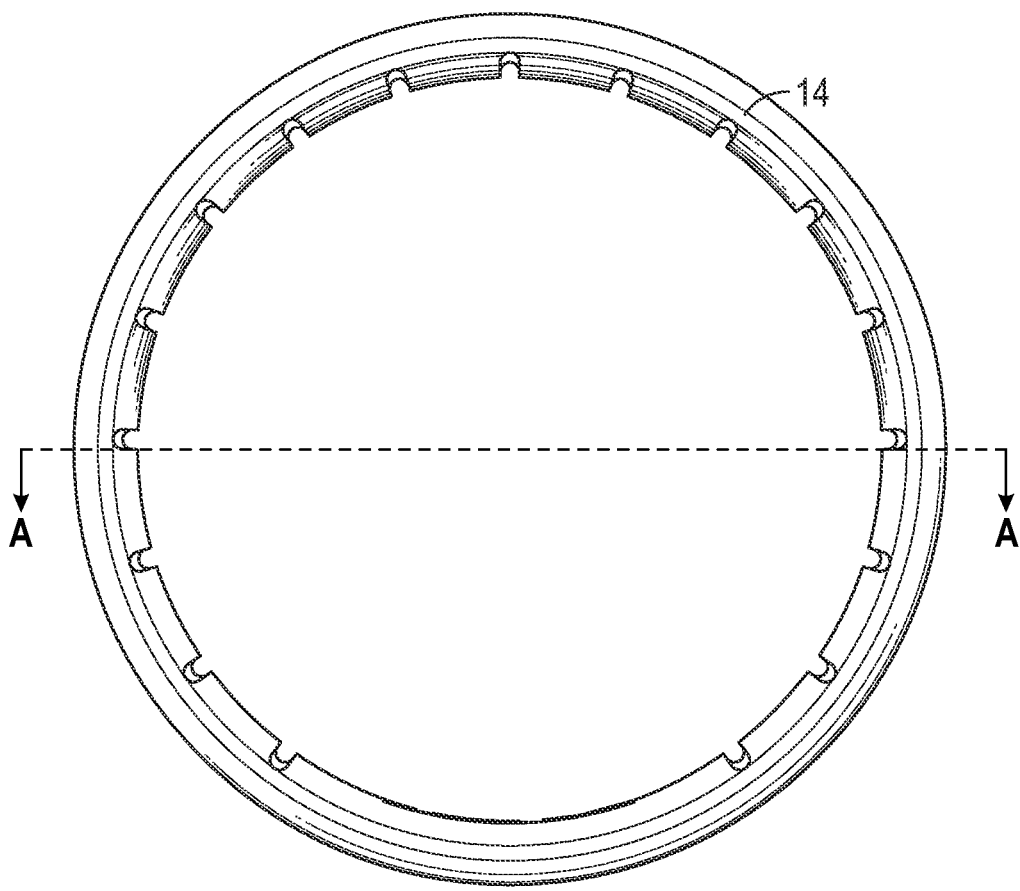
FIG. 3 is a bottom view of the breathable ring of FIG. 1.

Referring now to FIG. 1, a front perspective view of a representative illustration of a breathable ring (ring) 2 is shown. Various views of ring 2 are shown in FIGS. 2-6 as well. FIG. 1 shows that the ring is formed of a toroid 4 and FIG. 5, which is a cross-section of the ring taken along line A-A of FIG. 3, shows that the ring has an elliptical cross-section 16. In other implementations other shapes could be used. By non-limiting example, the ring could have a circular cross-section, an oval cross-section, a square cross-section, a rectangular cross-section, a triangular cross-section, a regular or irregular polygonal cross-section having any number of sides, and any other regular or irregular shape. The cross-section shown in FIG. 5 is seen to be fully solid, having no cavity therein, but in other implementations the ring could have one or more hollow portions, such as forming the shape of a torus or otherwise having hollow channels or cavities therein to affect expandability and the like.

FIG. 1 shows that the ring/toroid has an inner surface 6 and an outer surface 10. The inner surface and outer surface meet at a top 12 of the ring and at a bottom 14 of the ring. On the inner surface a number of grooves 8 are disposed at equal intervals except in a section of the inner surface where an image 20 is located. In the representative illustration the image is an inscription 22 which includes the letters "enso" which is a brand name. In other implementations the image could be something other than an inscription or physical recess, such as a physically raised portion, a color or other design, or the like. The image may be a logo and/or an alphanumeric inscription.

In each representative illustration shown in the drawings (i.e., for all of the rings of FIGS. 1-8) there are seventeen

(17) grooves shown. In each case they are shown being equally spaced apart except proximate the location of the image. From FIG. 6 it may be seen that in the representative example over three-quarters (and probably closer to 80-85%) of the inner circle formed by the inner surface has equally spaced grooves therein. This is not to say that the grooves take up 75-85% of the surface area formed by the inner surface—but rather that this portion of the inner surface is characterized by equally-spaced grooves (or in other words has grooves therein) regardless of how much surface area the grooves occupy, and that the remaining 15-25% of the inner surface has no grooves therein. Referring to the representative example shown in FIG. 2 there are multiple grooves 8, including a first groove 9 and a second groove 11 and several grooves 8 between the first groove and the second groove, each groove 8 between the first groove and the second groove being equidistant from its two nearest neighboring grooves, and no imaginary line drawn on the inner surface from the first groove to the second groove and intersecting all other grooves in between could span a distance less than 75-85% of the full circumference of a circle defined by the inner surface.

It may be understood that while the number of grooves may be modified, in general there are factors that may allow the practitioner of ordinary skill in the art to settle on an appropriate number of grooves. The more grooves there are, for example, the greater the ease with which moisture, dirt, grime, etc., can extract itself or be extracted from between the ring and the digit of the user. The more grooves there are, however, the less surface area there may be contacting the digit of the user, and thus the ring may grip the user's digit less strongly. The expandability of the ring as a whole may also be slightly increased with increased number of grooves. Accordingly, choosing the right number of grooves entails balancing these factors.

Figure 6:
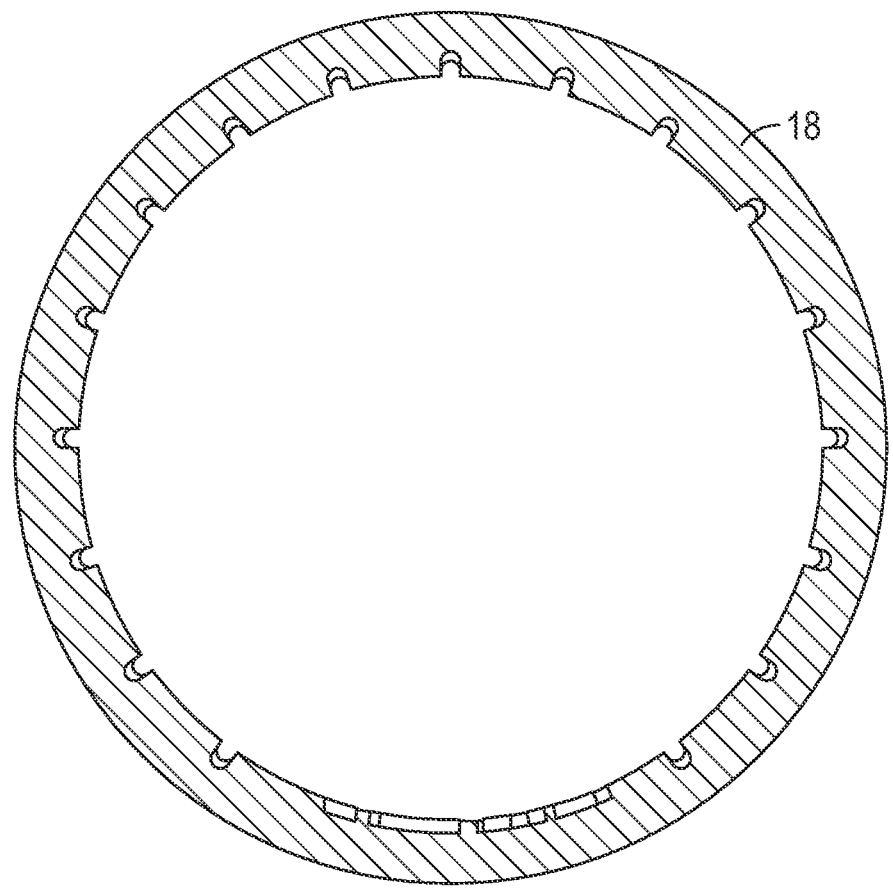
FIG. 6 is a cross-section of the breathable ring of FIG. 1 taken along line B-B of FIG. 4.

In each representative example shown in the drawings the grooves are seen to have a substantially semicircular cross-section when viewed along a direction parallel with the axis of revolution of the toroid (as seen in FIG. 6) and to have a longest length that is substantially parallel with the axis of revolution of the toroid. An "axis of revolution" of a toroid is defined herein as an axis about which an area may be revolved to fully form the shape of the toroid. The mentioned area is the cross-section which may be, by non-limiting example, an ellipse, circle, etc., as described previously. The axis of revolution, accordingly, does not pass through the toroid in the sense that no portion of the toroid touches the axis.

The longest length of each groove is not exactly parallel with the axis of revolution of the toroid because each groove has a curved configuration due to the curved nature of the inner surface of the ring. Nevertheless, in all implementations shown in the drawings the longest lengths of the grooves are substantially parallel, though not collinear, with the axis of revolution of the toroid. As used herein, the term "substantially parallel" as it relates to the grooves relative to the axis of revolution of the toroid is meant to convey that at least 80% of the longest length of each groove is less than 30 degrees offset from the axis of revolution of the toroid, and this is the case with the grooves shown in the drawings. Apart from being substantially parallel, it is also correct to say that each of the grooves is coplanar with the axis of revolution of the toroid, inasmuch as each groove fully lies in a plane in which the axis of revolution also fully lies. This is not to say that the grooves are all coplanar with one another, there may be some grooves that are coplanar with one another but each individual groove will lack coplanarity with most of the other grooves—but each groove is individually coplanar with the axis of revolution.

In implementations there could be other numbers of grooves and/or they could be spaced differently and/or they could take on other shapes and positions. By non-limiting example, there could be any number of grooves greater than, or less than, seventeen (17). The image could be omitted and there could be grooves placed in that location, and the spacing between all grooves could be such that each groove is equidistant, or substantially equidistant, from its nearest neighboring grooves. Or, in other implementations, one or more grooves could be present at the location of the image notwithstanding this affecting the appearance of the image. In other implementations the grooves could be spaced using some other regular, irregular, or complex pattern.

Although the grooves could be spaced irregularly, or using some complex pattern, it is to be understood that there are advantages to equally spaced grooves. Relatively equidistant grooves can be useful to ensure that the ability for moisture, dirt, and the like to exit is equally distributed across the inner surface. Accordingly, with relatively equidistant grooves, regardless of where moisture, dirt, grime, or the like is located between the ring and the digit of the user, it will always be near a groove so that its extraction is more likely. On the other hand, non-equidistant grooves may result in some areas being less likely to extract moisture, dirt, etc., and other areas being more likely to extract such elements, based on the higher concentration of grooves in some area and the lower concentration of grooves in another area. Thus, equidistant or relatively equidistant grooves are useful for having an evenly distributed capability to extract moisture, dirt, etc. Relatively equidistant grooves also have an aesthetically pleasing appearance.

The grooves in the representative examples have substantially semicircular cross-sections when viewed along a direction parallel to the axis of revolution of the toroid, as seen in FIG. 6. In other implementations they could have other cross-sections, such as square or substantially square, rectangular or substantially rectangular, triangular or substantially triangular, semi-oval or substantially semi-oval, semi-elliptical or substantially semi-elliptical, semi-polygonal or substantially semi-polygonal (including regular or irregular polygons having any number of sides), and any other regular or irregular shape. Although these shapes are not shown in the drawings, the practitioner of ordinary skill in the art will be able to easily envision and incorporate such cross-sections without the need for them to be explicitly depicted in the drawings.

The grooves in the drawings are seen to exist only on the inner surface of the ring. In other implementations outer grooves, having any configuration described herein for the inner grooves, could exist on the outer surface. Such outer grooves could be aligned or offset from the inner grooves, and could meet with the inner grooves (such that each groove itself completely circumscribes the ring 2) or the inner grooves and outer grooves could stop at the top and bottom of the ring so as to not interconnect.

The grooves of ring 2 increase the breathability of the ring. By "breathability" is meant the ability of the grooves to allow moisture, air, particulates, etc., to pass from one end of the ring (top or bottom) to the other (bottom or top), and/or to pass from inside a groove to outside a groove, along the inner surface or along the digit of a user, by passing through the groove. For example, for an athlete, worker, or other person wearing the ring, perspiration, dirt, grease, oil, water from washing/bathing, rain, water from aquatic sports, and other items collecting near the ring may pass through the grooves and not collect in excess around the ring or between the ring and the digit of the user. This may help to ensure that the ring does not become overly slippery—or otherwise that a desired friction between the ring and the digit of the user does not become too low—so that the ring does not slip off the digit of the user. It may also prevent moisture from remaining for long periods between the digit and the ring, thus reducing the likelihood of bacterial growth. Allowing dirt and other items to pass through the grooves may also ensure that the user's digit is not chafed, abraded, scraped, cut, soiled, or agitated by the dirt, grease, grime, or other items.

The grooves may also slightly increase the expandability of the ring, further allowing the diameter and therefore the circumference of the ring (perpendicular to the axis of revolution of the toroid) to increase as needed to accommodate fluctuations in the circumference of the digit upon which the ring is being worn. For example, a person participating in an athletic or physically engaging activity may have increased blood flow to the digit on which the ring is worn, which may result in an increase in the circumference of the digit. Injury or spraining of a digit may result in swelling which may increase the circumference of the digit. Cold temperatures may slightly decrease the circumference of the digit while hot temperatures may slightly increase the circumference of the digit. Weight gain or weight loss of the user over a period of time may increase or reduce the circumference of the digit, respectively. In any of these scenarios the expandability of the ring due to the presence of the grooves may accommodate the variation in size of the digit while still allowing the ring to be worn comfortably and snugly around the digit. The expandability of the ring may be enhanced by the presence of the grooves due to the smaller cross-section along the direction of expansion at the groove locations. In addition to the expandability due to the grooves, the expandability of the ring in general is allowed by the low elastic modulus of one or more materials from which the ring is formed, which is discussed further below.

The grooves in the representative examples, as discussed above, are substantially parallel with the axis of revolution of the toroid and are coplanar with the axis of revolution of the toroid. In other implementations other configurations could be used. Some grooves could be included that are substantially perpendicular with the axis of revolution of the toroid and coplanar with a plane that is perpendicular to the axis of revolution of the toroid (these grooves could intersect with the grooves shown in the drawings, for example travelling along the inner surface of the ring and centered around the axis of revolution of the toroid). In other implementations grooves could be slightly offset from a substantially parallel configuration, such that each groove is at an angle relative to the axis of revolution of the toroid—in other words a somewhat rifled configuration. In still other implementations some grooves could be at a first angle relative to the axis of revolution and others could be at another angle relative to the axis of revolution, such that the grooves form an overlapping or interlacing X pattern (the opposite-angled grooves intersecting one another in a crisscross manner). Each of the grooves shown in the drawings is seen to be straight (albeit curved due to the curved nature of the inner surface) along its full length from the bottom to the top of the ring. In other implementations the grooves could be wavy, curved in other directions than those shown in the drawings, and so forth. Any of the configurations and alternatives discussed herein for the grooves may be combined to form various additional/alternative configurations.

Although several types of groove configurations are described, it should be pointed out that there are advantages to having the simple, straight grooves shown in the drawings. One of these may be that, for manufacturing purposes, a ring with straight grooves may be more easily removed from a mold, though there are other useful reasons. Straight grooves allow moisture, dirt, etc., to have the shortest path of removal or extraction from between the ring and the digit of the user, whereas for other groove patterns such elements may have a longer path, and it may be more difficult for them to be extracted. For example, crisscross, wavy, and rifled patterns are described above for the grooves. Such patterns, since they involve grooves that are not substantially parallel with the axis of revolution of the toroid, require moisture, dirt, etc. to travel a longer distance to be extracted. Other patterns, such as patterns which have horizontal grooves (grooves perpendicular to the axis of revolution of the toroid) would result in some moisture, dirt, etc. getting in the horizontal grooves, and such elements would not be able to be extracted until they reach one of the vertical grooves (grooves substantially parallel with the axis of revolution). Accordingly, such a groove pattern may result in some moisture, dirt, etc., being more likely to stay trapped between the ring and the user's digit for a longer period of time. Moisture traveling from one side of the ring to another (for example from the top of the ring to the bottom of the ring or vice versa) between the ring and the digit may thus take a longer period of time to get through. The straight grooves shown in the drawings, which are substantially parallel with the axis of revolution of the toroid, and each of which is coplanar with the axis of revolution of the toroid, provide the shortest, quickest path for moisture, dirt, etc., to be removed from between the ring and the digit. Additionally, the straight grooves provide a simple, aesthetically pleasing design.

It should also be pointed out that the ideal fit of the ring is a fit in which not all of the inner surface is contacting the digit (particularly, there would not be contact at the grooves). This allows air to pass through the grooves, and the air facilitates or aids the removal of moisture, dirt, etc. This allows the area between the ring and digit to more quickly reach a clean, dry state. Often, when drying their hands or feet after washing them, or after swimming or sweating during an athletic activity, users do not move the ring during the drying process, and so some moisture or the like gets temporarily trapped between the ring and the digit. With the rings disclosed herein the user does not have to move the ring to fully dry the digit—instead the air that flows through the grooves allows a user's digit to quickly dry even without moving the ring to manually dry all of the digit.

It is also noted that some users appreciate a tight, snug fit for a ring. For such users, the ability to dry the area underneath a ring may be particularly difficult because the ring may be difficult to move in order to fully complete the drying process. The rings disclosed herein, however, allow for the easy drying of such areas even if the ring is snug on the user's digit. The ring does not need to move to accommodate the full and quick drying of the digit because the grooves will provide space between the ring and the digit and will allow air flow even if the ring, in general, is tight. Thus, the evaporation or otherwise removal of moisture is accelerated due to the grooves.

It has also been observed, by at least one purchasing consumer, that the ring allows moisture and the like to escape better than the ring of a competitor which uses wavy, semi-horizontal grooves (which competitor ring is disclosed in an information disclosure statement filed herewith). The consumer indicated in a post to the inventors' website dated May 25, 2017: "Ordered this and a set of [competitor] at the same time . . . Ring fits true to size ([the competitor ring] did not). Enso Elements really does let moisture out. Enso kept my finger dry under ring better than [the competitor ring] (which may [be] because [the competitor ring] was a bit too small?)." While the consumer at least partially attributed the sizing to the ability of the ring to let moisture out, it is believed by the inventors that the specific nature of the grooves—i.e., straight grooves giving moisture the quickest and easiest exit—also helped to let moisture out quicker.

The ability of the breathable rings 2/28 to achieve a good fit that is not too tight but which is still snug, partially through the expandability and the presence of the grooves, also reduces irritation and discomfort. Rings that fit too tightly can cause chafing, abrasion, irritation, and so forth, and as pointed out by the above quoted consumer they may also reduce the ability of moisture to escape from beneath the ring.

Figure 4:
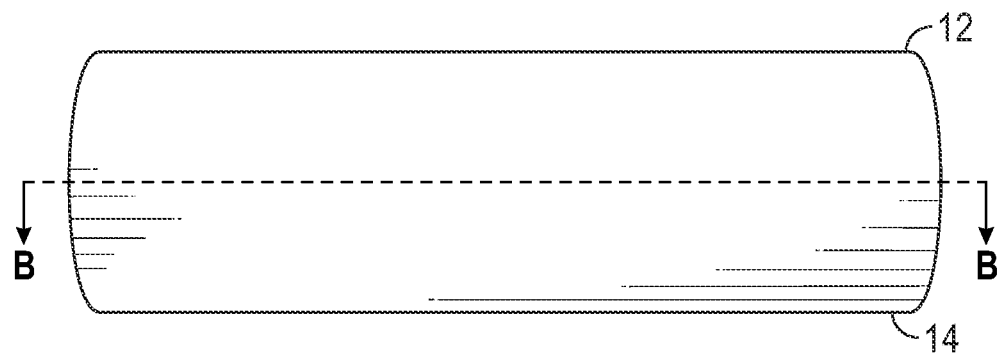
FIG. 4 is a left side view of the breathable ring of FIG. 1, the front, right, and rear side views being mirror images.
Figure 5:
FIG. 5 is a cross-section of the breathable ring of FIG. 1 taken along line A-A of FIG. 3.

In FIG. 6 the ring is seen to have a circular cross-section 18 taken along line B-B of FIG. 4. In other implementations the ring could have other cross-sections along this direction, but as the ring is intended as an item of jewelry for the digit of a user, in most implementations the ring will have a circular or substantially circular cross-section along this direction.

The ring in implementations is formed of a flexible or expandable material 24 which is a polymer 25, and in the representative examples shown in the drawings the expandable material is silicone. In other implementations the expandable material could be a rubber, an elastomer, an elastic polymer, and so forth. While the terms "expandable," "flexible" and "elastic" are terms of degree—in other words all materials including metals, ceramics, intermetallics, composites, etc., have some elasticity and expandability— the term "expandable material" as used herein is defined as "a material having an elastic modulus (Young's modulus) at least as low as 5 gigapascals (GPa)." In other implementations the expandable material may have an elastic modulus at least as low as 1 GPa, or at least as low as 0.1 GPa, or at least as low as 0.01 GPa. In other implementations the expandable material may have an elastic modulus at least as low as that of silicone. In other implementations the expandable material may have an elastic modulus at least as low as that of rubber. As used herein, the terms "expandable" and "flexible" are synonymous. Accordingly, all references to "expandable polymers" or "expandable rings" or the like apply equally to "flexible polymers," "flexible rings," etc. Rings made of silicone may have any properties and/or may be made using any techniques that are known in the art for silicone.

The relatively low elastic modulus of the expandable material (compared, for example, with metals from which rings are commonly formed—which have elastic moduli on the order of tens (10s) or hundreds (100s) of GPa) allows for the ring to repeatedly undergo elastic deformation to accommodate fluctuations in the digit circumference without undergoing plastic (permanent) deformation at levels of strain at which other materials (including metals) would undergo plastic deformation.

The expandability of the ring also enhances its safety. In some settings a metallic ring may increase the likelihood of a digit being injured or even severed from a user's hand. Some work environments preclude the use of metallic jewelry, and in some work or sporting environments (such as mechanics or contact sports) the use of metallic jewelry on a digit increases the likelihood of injury to the user or others. In such cases the expandable nature of the ring may prevent a user's digit from being injured or severed and/or may prevent other injuries to the user or others. In other implementations the relatively lower shear strength of the expandable material (compared to metals, for instance), allows for the ring itself to be sheared at a lower force than that which would injure or shear a user's digit, so that the ring may shear while preventing injury to the user or another person. While the shearing of an item of jewelry is generally undesirable, it is of course preferred to the shearing or serious injury of a finger or toe or some other serious injury to the user or others.

In implementations the ring includes antimicrobial elements (antimicrobial particles) 26. Element number 26 shown in FIG. 5 simply points to the interior of the expandable material, and this is meant to convey the idea that the entire expandable material from which the ring is formed may have antimicrobial elements interspersed throughout. Some of these antimicrobial elements would thus be entirely comprised in an interior of the ring while some of them may be exposed on the outer and inner surfaces (and top and bottom) of the ring. This could be accomplished, by non-limiting example, by mixing a powdered antimicrobial element into a liquid resin or melted polymer, the liquid resin or melted polymer then being formed into the shape of the ring and solidified so that the antimicrobial elements are locked in place in an interspersed configuration in the solidified ring. In other implementations the antimicrobial elements could only be present at an exterior of the ring, such as on the inner and outer surfaces and on the top and bottom. This could be accomplished by adhering a fine coating of a polymer, a resin, a composite, a metal, or some other material, including the antimicrobial elements, on the exterior of the ring. An antimicrobial coating in some implementations could be water or solvent based and could be a coating marketed under the trade name STERITOUCH by Steritouch LTD. of Abertillery, Gwent, Wales.

In all of the implementations shown in the drawings the antimicrobial elements are not just applied as a coating but are interspersed throughout the expandable material and include ionic silver particles marketed under the trade name STERITOUCH by Steritouch LTD. In implementations the ionic silver particles are larger than the nanometer-sized range—in other words having an average diameter larger than 100 nanometers (nm). The practitioner of ordinary skill in the art may choose to use an antimicrobial coating or to have antimicrobial elements interspersed throughout the ring according to a few factors, as described below.

Interspersing antimicrobial elements throughout the ring, either homogeneously or otherwise, allows the antimicrobial effect to not be diminished (or not greatly diminished) by scratches, cuts, nicks, etc., so that such a configuration is useful when the ring is used in a rougher environment. On the other hand, if a ring is not used in a rough environment (but, for example, in a wet environment such as a sweaty athletic activity, swimming, etc.), using an antimicrobial coating instead of interspersing antimicrobial particles throughout could reduce the number of antimicrobial particles which need to be used on each ring by concentrating the particles at the external surfaces of the ring, which may reduce material costs but which will add a coating step (as opposed to the antimicrobial particles being added during a mixing step). It is pointed out here that the "exterior surfaces" of the ring include the inner surface, the outer surface, the top, and the bottom of the ring—basically all portions of the ring that are visible to the user without cutting or severing the ring.

It is also true that, in some implementations and under some conditions, antimicrobial particles sold under the trade name STERITOUCH may be configured to migrate generally towards the surfaces of an item during processing and/or curing, so that there may be a somewhat higher concentration of antimicrobial particles at or near the surfaces of the ring after the curing process, though with antimicrobial particles still present and interspersed throughout the ring. Such a configuration may allow for concentrating antimicrobial effects at or near the surface of the ring without adding a coating step, and may reduce the number of antimicrobial particles that need to be used, though with the potential of reduced antimicrobial effect at the presence of deeper cuts/nicks in the ring. Accordingly, the specific configuration may be chosen by the practitioner of ordinary skill in the art to achieve the desired balance of benefits. It is also pointed out that there may be a similar mechanism at play with precious material particles (which particles are described in more detail later), whereby they tend to migrate towards the surfaces of the ring during curing.

For the purposes of this disclosure, a distribution of particles (precious material particles or antimicrobial particles) which includes particles present at all exterior surfaces of the ring, and which may include a higher concentration of particles at or near the external surfaces, but which also includes a non-zero concentration of particles interspersed throughout all depths of the ring between the inner surface and outer surface and between the top and bottom of the ring, is defined as a "substantially even distribution." For purposes of distinction and measurement, a distribution which includes a concentration of zero particles at any depth within the ring (for example zero particles at a depth located centrally between inner surface and outer surface) would not have a "substantially even distribution" of those particles. As another example, a ring which has a zero concentration of particles at a depth of 1 millimeter (mm) from the inner surface of the ring would not have a "substantially even distribution" of those particles within the ring.

The antimicrobial elements prevent or slow down the formation of bacteria and microbes on the exterior and/or even in the interior of the ring. This has obvious health benefits. It may also ensure that the ring does not acquire an unpleasant odor even though continuously subjected to sweat, dirt, grime, moisture, and the like. Experiments were conducted on the ring material with added antimicrobial elements and the antimicrobial elements were shown to provide an effective reduction of microbial growth.

In one experiment three samples of ring material having 1% of a mixture including antimicrobial elements achieved greater than a 99.99992% reduction of *Escherichia coli* (*E. coli*) colony forming units (CFUs), tested at 35 degrees Celsius at 0 and 24 hours, compared with a control sample of an untreated polyethylene film. The control sample and the three samples of ring material began with 100,000 CFUs at 0 hours, and at 24 hours the control sample had 13,000,000 CFUs while the three ring material samples had under 10 CFUs. These tests were performed according to the ISO 22196/JIS Z 2801:2000 standard.

In another test, one sample of ring material having 1% of a mixture including antimicrobial elements achieved greater than a 99.99991% reduction of *Escherichia coli* (*E. coli*) colony forming units (CFUs), tested at 35 degrees Celsius at 0 and 24 hours, compared with a control sample of an untreated polyethylene film. The control sample and the sample of ring material began with 160,000 CFUs at 0 hours, and at 24 hours the control sample had 12,000,000 CFUs while the ring material sample had under 10 CFUs. This test was also performed according to the ISO 22196/JIS Z 2801:2000 standard.

In another test, one sample of ring material having a 1% mixture including antimicrobial elements achieved greater than a 99.995% reduction of methicillin resistant *Staphylococcus aureus* (MRSA), tested at 35 degrees Celsius at 0 and 24 hours, compared with a control sample of an untreated polyethylene film. The control sample and the sample of ring material began with 220,000 CFUs at 0 hours, and at 24 hours the control sample had 240,000 CFUs while the ring material sample had under 10 CFUs. These tests were also performed according to the ISO 22196/JIS Z 2801:2000 standard.

The rings may include one or more types of precious material particles. FIG. 1 shows, for example, precious material particles 27. While the lead line in the drawing simply points to the exterior surface of the ring, it is to be understood that the precious material particles have a substantially even distribution throughout the ring (though in other implementations the precious material particles could be added mainly to the exterior as a coating, such as with a paint or the like). FIG. 5 shows that there are precious material particles 27 in the interior of the ring. The precious material particles are not individually shown in FIG. 1 or 6 since they are in powdered form when added to the ring and their size is such that each particle may not be individually visible to the naked eye upon inspection.

The precious material particles may include a precious metal or a precious non-metal material. Non-limiting representative examples of precious materials include: powdered gold particles; powdered non-ionic silver particles; powdered copper particles; powdered platinum particles; powdered/crushed pearl particles; and so forth. The precious material particles may have any particle size and may have any distribution throughout the toroid or on or in the toroid as is described above for the antimicrobial particles, with corresponding benefits that may be balanced by the practitioner of ordinary skill in the art to achieve desired benefits.

The ring may include one or more colorants added to alter the appearance or hue of the ring. The colorant could be added as a coating after the ring is molded—such as a paint or the like—or the colorant could be mixed in prior to molding. In the examples shown in the drawings the colorant is not specifically pointed to because the colorant is homogeneously interspersed throughout the ring so that it is visible in all parts of the ring, exterior and interior. There are advantages of each approach. An after-molding coating may reduce material costs due to less colorant being needed but adds a coating step (as opposed to integrating the coloring step with the mixture step) and the coating may be liable to be worn off or scratches may tend to reveal the underlying color. On the other hand, using colorant in the mixing step may increase material costs, but removes the coating step (instead integrating the coloring step with the mixing step), and if the ring gets nicked, scratched, or the like, the color of the ring at the location of the nick, scratch, etc. will be the same as that on the exterior of the ring surrounding the affected area. Accordingly, the practitioner of ordinary skill in the art may consider the benefits of each option and balance the benefits as desired. In the representative examples shown in the drawings the colorants are formed of proprietary blends and are homogeneously mixed with the polymer material prior to curing.

Various colors are achievable through the proprietary blends, though the practitioner of ordinary skill in the art may achieve various colors by selecting available colorants from known providers. In implementations the ring may have any color or combination of colors by use of the colorants. In implementations the colorant may have a color matching a color of the precious material particles. For example, a ring having gold particles may also include a gold-colored colorant, a ring having non-ionic silver particles may also include a silver-colored colorant, a ring having copper particles may also include a copper-colored colorant, a ring having platinum particles may also include a platinum-colored colorant, a ring having powdered or hydrolyzed pearl particles may also include a pearl-colored or pearlescent colorant, and so forth. In some cases the ring may have a metallic look due, in part, to the colorant. The colorant may include actually shiny particulates interspersed throughout to add a shine or glimmer to the ring. In some implementations the precious materials are not actually visible, or are nearly not visible, and the color of the ring and/or the metallic shine, luster, etc., is due entirely, or in large part, to the colorant.

On the other hand, a colorant could simply be applied to the external surfaces of the ring, as disclosed above. In implementations a coating could be used to give the silicone (or other expandable material) ring a metallic appearance. This could be done using a metallic-colored lacquer or paint applied to the exterior of the ring to give the ring an appearance of a metal (copper, gold, silver, platinum, tungsten, titanium, etc.). In implementations this coating could also include the antimicrobial elements (by non-limiting example, a lacquer coating having actual silver particles may impart a silver appearance to the exterior of the ring while simultaneously providing some ionic silver for antimicrobial properties).

But, in the cases shown in the drawings wherein the colorant is evenly distributed throughout the ring, the copper, gold, silver, or other metallic or other colored appearance exists at all external surfaces and throughout the entire cross-section of the ring. The example colors and the example color/precious material matches given herein are only examples and others are possible. In some implementations the precious material and the colorant do not match, for example one implementation of a ring has a turquoise colorant and silver particles for the precious material. Naturally, colorants in many forms (powdered, liquid, etc.) and coloring techniques for polymers in general exist in the art and may be used to color the rings. The colorants used for the rings in the drawings include powdered pigments. The colorants may also include shiny particles to add shine or luster. Precious materials in powdered form are also available from known suppliers and the practitioner of ordinary skill in the art may select appropriate precious materials, colorants, and particle sizes for each as desired.

In the instance wherein a colorant has a color matching the color of the included precious material, the colorant serves a useful function in that it indicates to the user the precious material that is included in the ring, which precious material may not be visible or may not be easily visible to the user.

The image 20 that is representatively illustrated in the drawings is a brand name. In implementations the image could alternatively or additionally include other elements, such as the initials or name of a person, an inspirational phrase, or the like. Alphanumeric characters, logos, and non-text/non-numeric images could be used as well.

Various manufacturing techniques may be used to form the ring such as, by non-limiting example, compression molding and/or injection molding. Other manufacturing techniques may be used. In the representative examples shown in the drawings the ring is a compression molded ring.

The ring implementation shown in FIGS. 1-6 is a men's size 11 ring. The implementation shown in FIGS. 7-8 is a women's size 10 ring and has similarly named elements having similar characteristics to the ring elements described above for ring 2.

Figure 7:
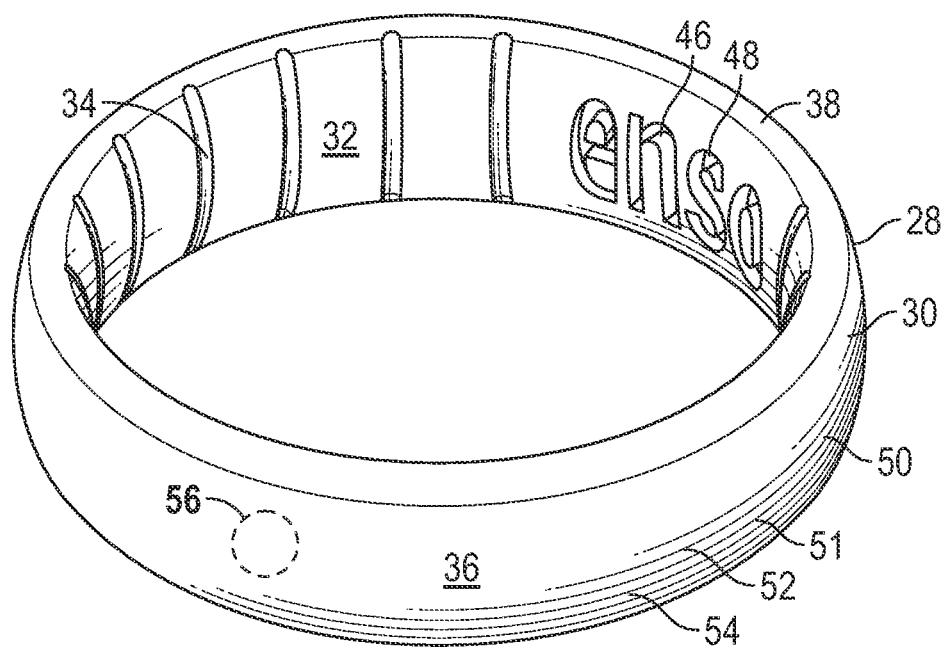
FIG. 7 is a front perspective view of another implementation of a breathable ring.
Figure 8:
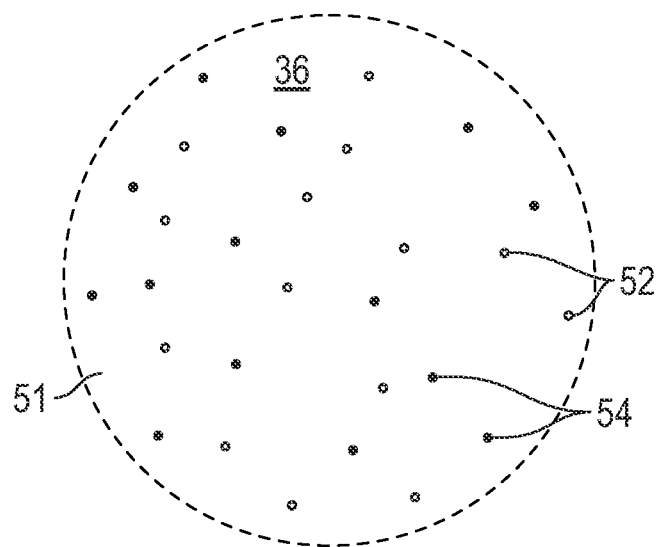
FIG. 8 is an exaggerated magnified view of area 56 of the surface of the breathable ring of FIG. 7.

For example, breathable ring (ring) 28 of FIGS. 7-8 is formed of a toroid 30. The ring/toroid has an inner surface 32 with grooves 34, an outer surface 36, a top 38 and a bottom (not seen in the drawings but the bottom of ring 28 is similar to bottom 14 of ring 2), an elliptical cross-section (not seen in the drawings but the elliptical cross-section of ring 28 is similar to elliptical cross-section 16 of ring 2), a circular cross-section (not seen in the drawings, but the circular cross-section of ring 28 is similar to circular cross-section 18 of ring 2), and an image 46 on the inner surface which is an inscription 48 in the representative example. The ring is formed of an expandable material 50 (which is a polymer 51) and includes antimicrobial elements 52 (antimicrobial particles). Accordingly, apart from its size (and/or its relative dimensions), ring 28 is relatively similar to ring 2 described above.

Other sizes and shapes than those shown in the drawings are possible. Women's rings of any size range (including but not limited to sizes 4-10), men's rings of any size range (including but not limited to sizes 7-14), children's rings of any size range, and the like, may be formed and may include any of the properties described above for rings 2 and 28.

Various designs could be implemented at the exterior (including inner and outer surfaces) of the ring. Some rings could have a rougher appearance/exterior, and others may have a smoother appearance/exterior. One or more images and/or designs could be included on the outer surface of the ring. Grooves on the outer surface of the ring, or inscriptions, could be included for aesthetic design and/or for functional purposes. Other configurations are possible.

Ring 28 is seen in FIG. 7 to have precious material particles 54, and area 56 of FIG. 7 is shown magnified in FIG. 8, magnified to a magnification sufficient to reveal the precious material particles and antimicrobial elements/particles. FIG. 8 reveals a representative example of a homogeneous distribution of precious material particles and antimicrobial particles at the magnification site on the outer surface 36 of the ring, the precious material particles and antimicrobial particles also being interspersed within the polymer 51. The magnification needed to reveal individual particles may be much greater than the scale shown in FIG. 8 but the particle sizes are exaggerated for ease of viewing. For any of the rings disclosed herein the precious material particles and the colorants may have any distribution, including a substantially even distribution, a homogeneous or even distribution, and so forth, as is described above for the antimicrobial particles, with corresponding benefits that may be considered by the practitioner of ordinary skill in the art when determining which distribution to use.

A representative example of processing steps is as follows. In implementations the silicone portion of the ring is formed using a two-component resin mixture (hereafter called components A and B). Components A and B are both transparent liquids and are mixed together, the mixing beginning a curing process. While the mixture is still liquid a number of proprietary colorants are added to achieve any desired color and optical properties including shine and luster, the antimicrobial particles are added, and precious material particles are added. The mixture is mixed using a speed mixer until all elements are evenly distributed. The mixture is then compression molded into the shape of the ring and kept in the mold until the curing process is completed. The compression mold has a polished finish so that the rings come out having a smooth exterior surface (despite this the grooves, the snug fit, and/or the coefficient of friction between the ring and the digit may prevent the ring from undesirably sliding or rotating on the digit). The grooves and the "enso" logo in the representative examples are formed by the mold which has these shapes built in. After removal from the mold any excess material may be removed.

Weight percentages of the components of the rings may be modified as desired. Since, during the curing and molding process, the moisture content of the polymer may be modified, initial weight percentages of the polymer may be slightly off from the final cured weight percentages. Nevertheless, in the cured state in implementations the silicone or other expandable polymer may form at least 80 percent, at least 85 percent, at least 90 percent, or at least 95 percent of the weight percentage of the ring/toroid. Varying the amount of expandable polymer understandably varies the expandability of the ring. In cured form in implementations the antimicrobial particles may form between 0.05 and 5.0 weight percent, or between 0.5 and 1.5 weight percent, of the ring/toroid. Varying the number of antimicrobial particles understandably varies the antimicrobial properties of the ring as well as the material costs. In cured form in implementations the precious material particles make up between 0.1 and 5.0 weight percent, or between 0.1 and 1.0 weight percent, or between 0.3 and 0.6 weight percent, or between 0.4 and 0.5 weight percent of the ring/toroid. Varying the amount of precious material particles may vary the appearance, weight, and material cost of the ring. It should be pointed out that increasing the amount of precious material in the ring may make the ring more desirable to a user because, among other things, it can increase the resale value of the ring.

Any of the rings disclosed herein may be formed without including any antimicrobial particles.

Figure 9:
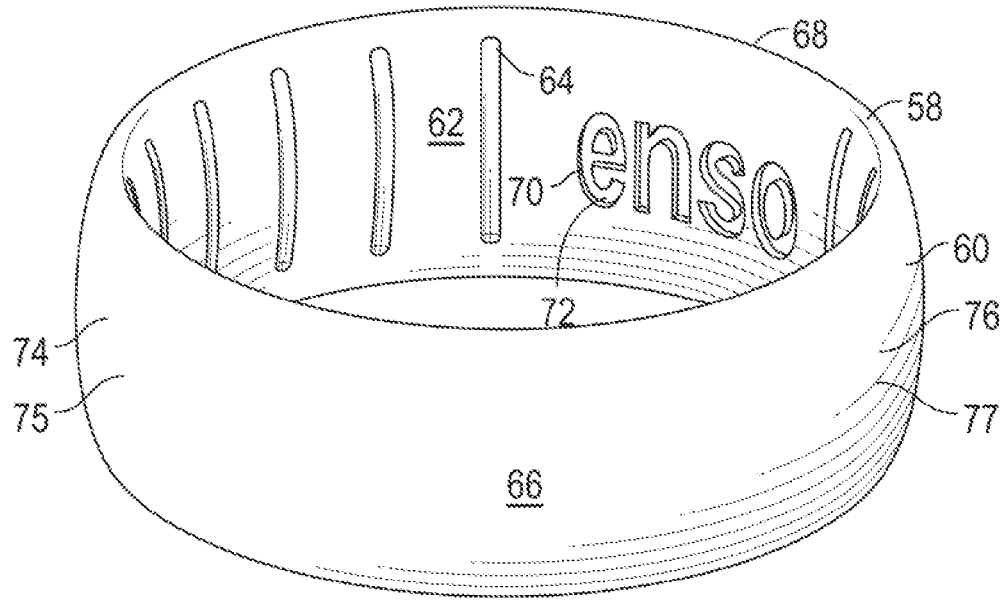
FIG. 9 is a front perspective view of another implementation of a breathable ring.

In implementations of rings the grooves may not extend fully from top to bottom of the ring. By non-limiting example, FIG. 9 shows a representative example of a breathable ring (ring) 58 which has the shape of a toroid 60 having an inner surface 62 with a plurality of grooves 64 therein, an outer surface 66, a top 68, and a bottom (not numbered). The grooves may be seen to not extend fully from the top to the bottom of the ring, as opposed to the grooves of ring 2 which extend from top to bottom. This is done to change the aesthetic appeal of the ring—in some implementations the ring has a better look if the grooves do not extend fully to the top and bottom of the ring. It may be possible, however, that this results in some decrease in the amount of airflow/breathability in some rings, though in others the same level of breathability/airflow may be maintained even with the shorter grooves. The ring may in other ways be similar or identical to other rings disclosed herein, such as having an elliptical cross section and a circular cross section (for cross sections taken from different perspectives), an image 70 which may be an inscription 72, and so forth. The ring 58 may be formed of an expandable material 74, which may be a polymer 75, and in implementations may include antimicrobial elements (antimicrobial particles) 76 and/or precious material particles 77 as with other rings. Nevertheless, as with other rings, the antimicrobial particles and/or precious material particles may, in implementations, be excluded.

Figure 10:
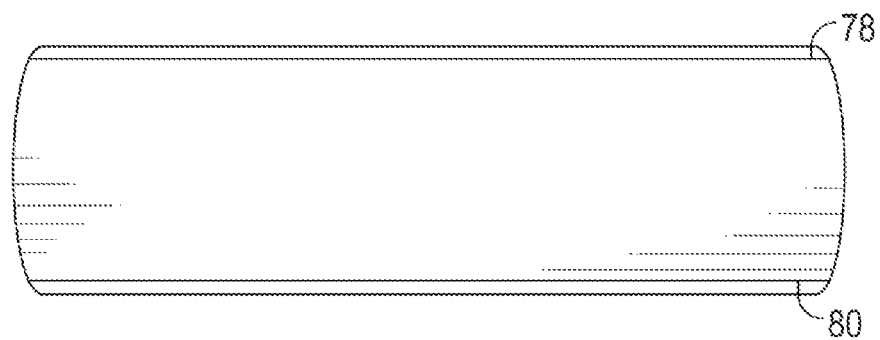
FIG. 10 is a left side view of the breathable ring of FIG. 9, the front, right, and rear side views being mirror images.
Figure 11:
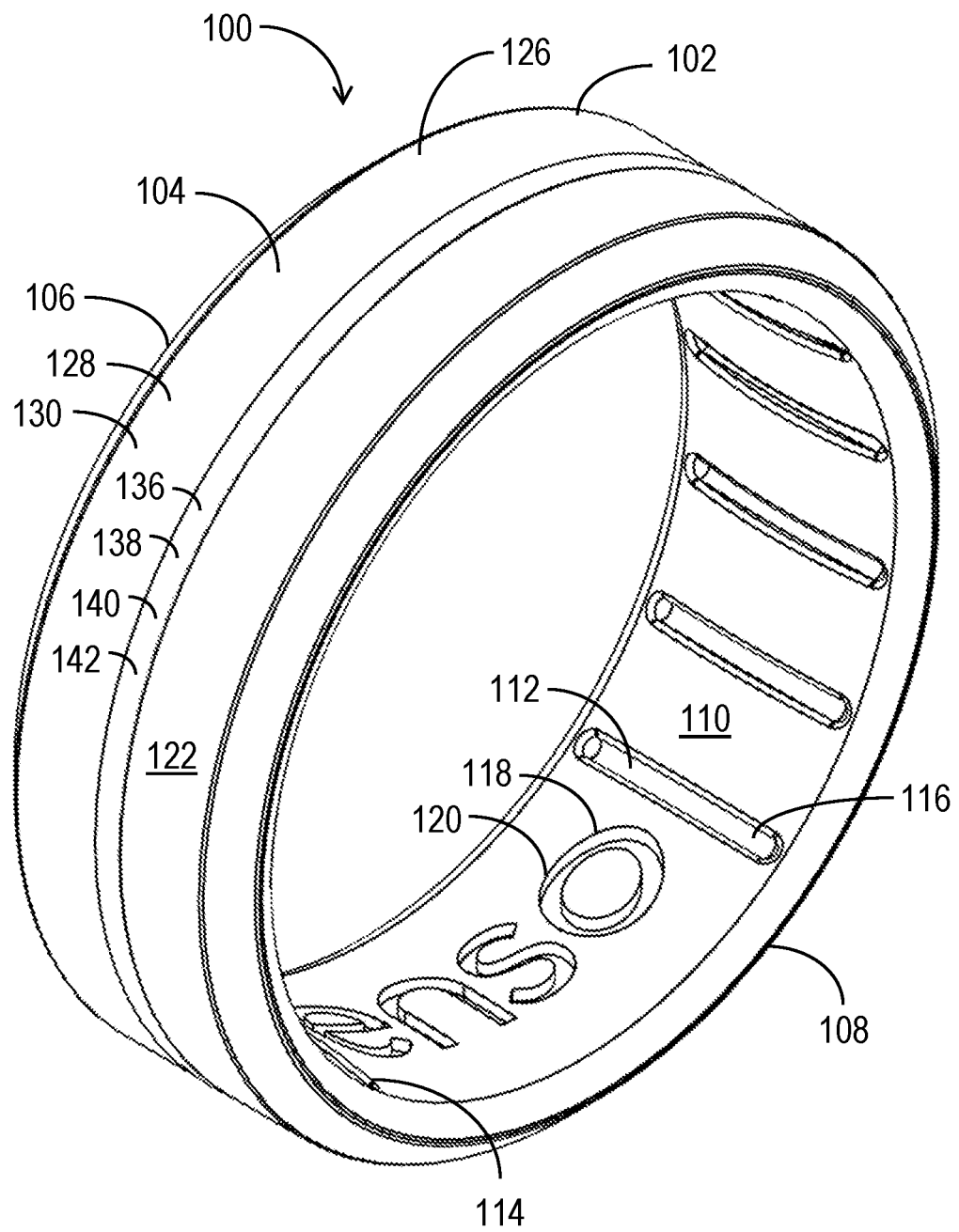
FIG. 11 is a front-bottom view of an implementation of a multicolored flexible wearable.

Ring 58 is also seen to be fully rounded at the top (it is also fully rounded at the bottom, though this is not visible in FIG. 9), as opposed to ring 2 which is flat at the top and bottom and has distinct, well-defined edges where the top and bottom meet the sides (inner surface and outer surface) of the ring. In some implementations the fully-rounded edges of the ring 58 have a 0.019 inch radius. Additionally, FIG. 10 shows an implementation of ring 58 which includes a parting line 78 (which in implementations is unavoidably created during the molding process) and a false parting line 80, which is intentionally added to be symmetrical with the parting line 78 so that there is one line towards the top and one towards the bottom of the ring. This increases aesthetic appeal of the ring.

Breathable rings may be made from polymers other than those disclosed herein, may be formed using manufacturing techniques other than those disclosed herein, may include precious materials other than those disclosed herein, may include colorants or colorant types other than those disclosed herein, and may include antimicrobial elements other than those disclosed herein. Those of ordinary skill in the art will readily be able to select appropriate materials, manufacturing techniques, and/or antimicrobial elements from the disclosures provided herein. The implementations listed here, and many others, will become readily apparent from this disclosure. From this, those of ordinary skill in the art will readily understand the versatility with which this disclosure may be applied.

Referring now to FIGS. 11-15, an implementation of a multicolored flexible wearable (wearable) 100 is representatively illustrated. The wearable 100 may be, for example, a ring or a bracelet. Accordingly, its size may be adjusted (with or without adjusting relative dimensions) so that it may be worn on a digit of a user (such as any finger or toe) or on a limb of a user (such as around an ankle or leg of a user or around a wrist or arm of a user). In implementations the wearable may be sized so that it fits snugly over the digit or limb of the user, and in other implementations it may be sized so that it is in a loose configuration but nevertheless stays in place until manually removed. For example, when sized to be worn as a ring it may be sized to remain on a finger until manually pulled past a knuckle to extract it from the finger, which may cause the ring to stretch while passing over the knuckle. Similarly, when sized to be worn as a bracelet it may be sized to sit snugly or loosely on the wrist or near the ankle of a user until manually pulled off the hand or foot, which may cause the bracelet to stretch while passing over the hand or foot. The bracelet or ring similarly may be stretched in order to be placed fully on the digit or on the leg, ankle, arm, or wrist, and the flexible nature of the wearables disclosed herein may facilitate this. It is also pointed out that bracelets may have a clasp or the like included, which may be made of a different material than the rest of the wearable (such as a metal or other material), and in such instances may not need to stretch at all to be placed around the user's wrist/arm. Necklaces and chokers could also be made using the methods disclosed herein, and the flexible wearables disclosed herein could be sized/proportioned to be worn as necklaces/chokers, which may also have a clasp or the like to open/close the wearable, and any of the wearables disclosed herein could also include or exclude jewels, attached/coupled pendants, and so forth.

The wearable 100 is multicolored, and in the implementations shown in the drawings this is accomplished by having two separate portions of the wearable that include distinct colorants. The wearable includes a first portion 102 which is seen to form the shape of a toroid 104. The first portion may not be a perfect toroid. A toroid is generally a shape formed by taking a two-dimensional (2D) shape and rotating it around an axis in three-dimensional space, where the axis of rotation and the 2D shape are fully contained in a common plane. The toroid of FIGS. 11-15 is seen to not be a perfect toroid because rotating a 2D shape would not result in the grooves 112 and image 118 that are seen on the inner surface 110 of the wearable 100. Nevertheless, it may accurately be said that the first portion contains or comprises a perfect toroid, because a portion of the wearable excluding enough of the inner diameter to exclude the grooves and image would be a perfect toroid. Wearables disclosed herein may be said to comprise a toroid even if they do not comprise a perfect toroid. For example, versions of wearables that include a clasp or the like, so that the polymers themselves do not make up the full loop of the wearable, nevertheless form a toroid when the wearables are in the clasped/closed configurations. Even if wearables with clasps included a chain portion or the like (for example a polymer portion that is clasped together using two chain elements on either end of the polymer portion), so that the wearable never comprises a perfect toroid, for the purposes of this disclosure such a wearable would still be considered to form a toroid (albeit an imperfect toroid) when in the closed configuration.

The first portion is formed of a flexible material 126 which may be, by non-limiting example, any of the flexible polymers described in this disclosure for other wearables and rings, having any of the material properties/characteristics, mechanical properties/characteristics, and other properties/characteristics described herein for those flexible polymers. In the implementation shown in the drawings the flexible material 126 is silicone and has similar material, mechanical, and other properties as described above for silicone rings.

Figure 14:
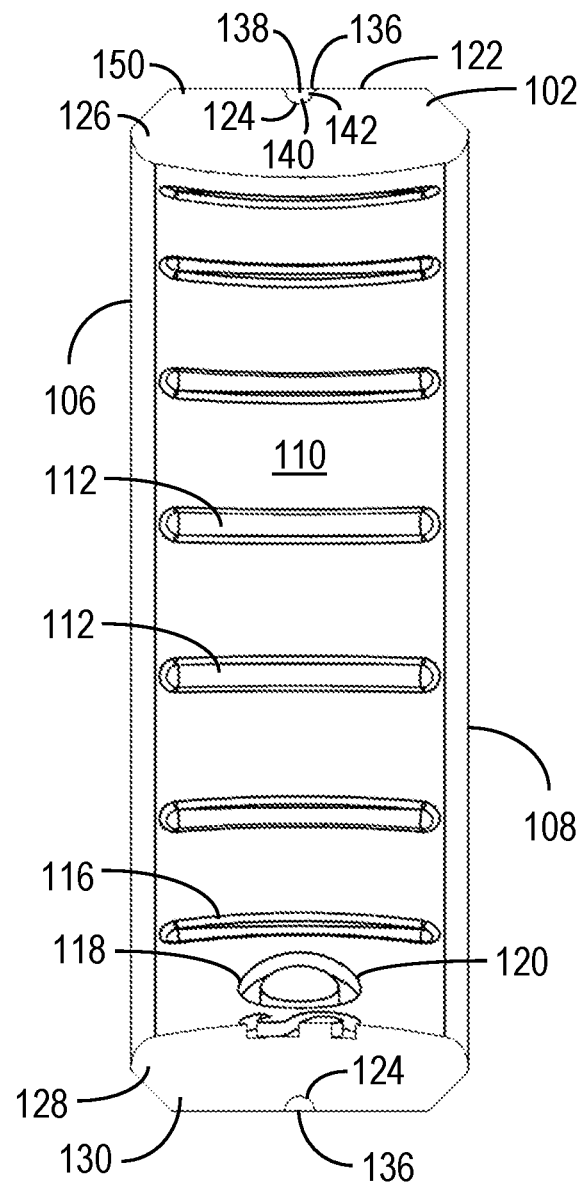
FIG. 14 is a front cross-section view of the multicolored flexible wearable of FIG. 13 taken along line D-D.
Figure 15:
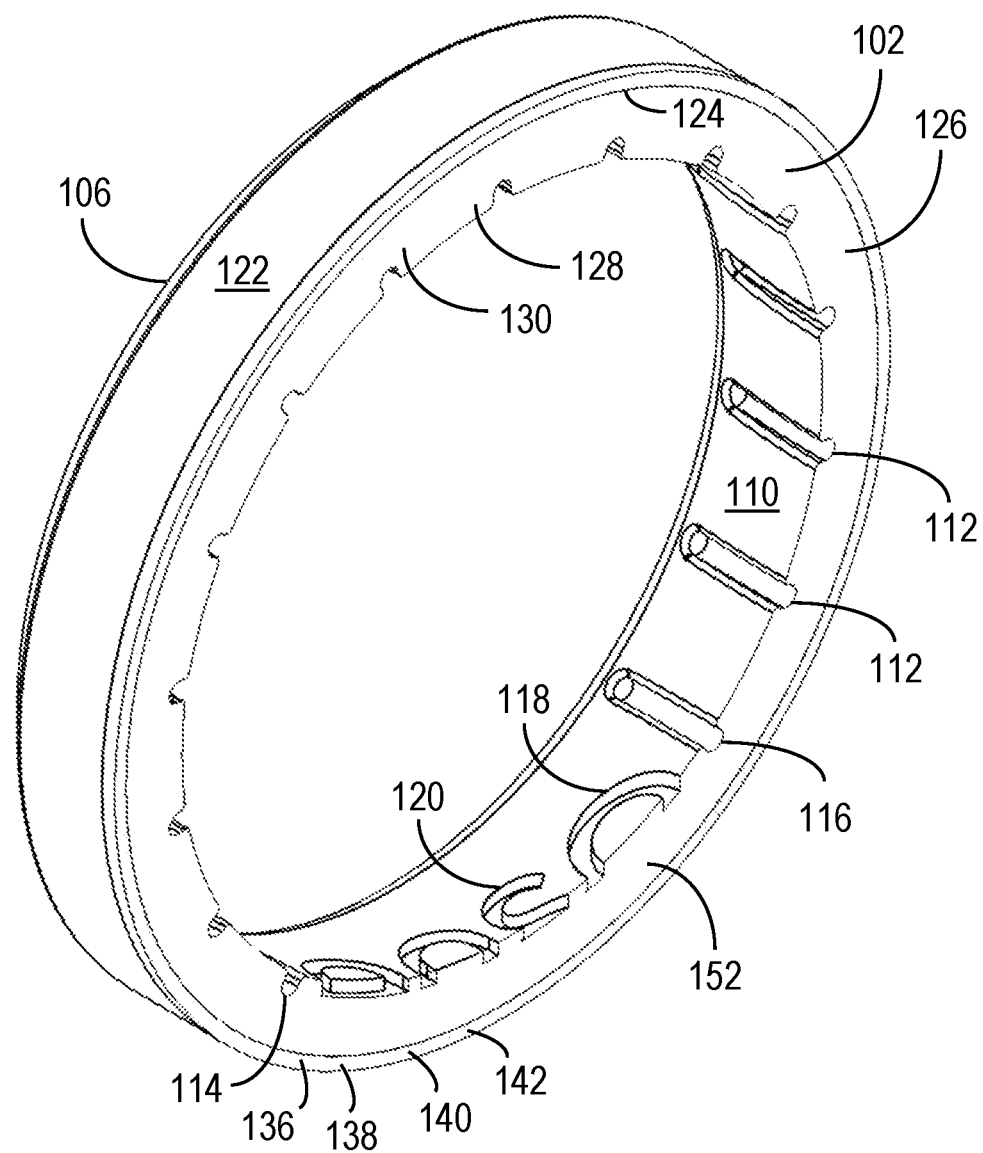
FIG. 15 is a front-bottom cross-section view of the multicolored flexible wearable of FIG. 12 taken along line C-C.
Figure 16:
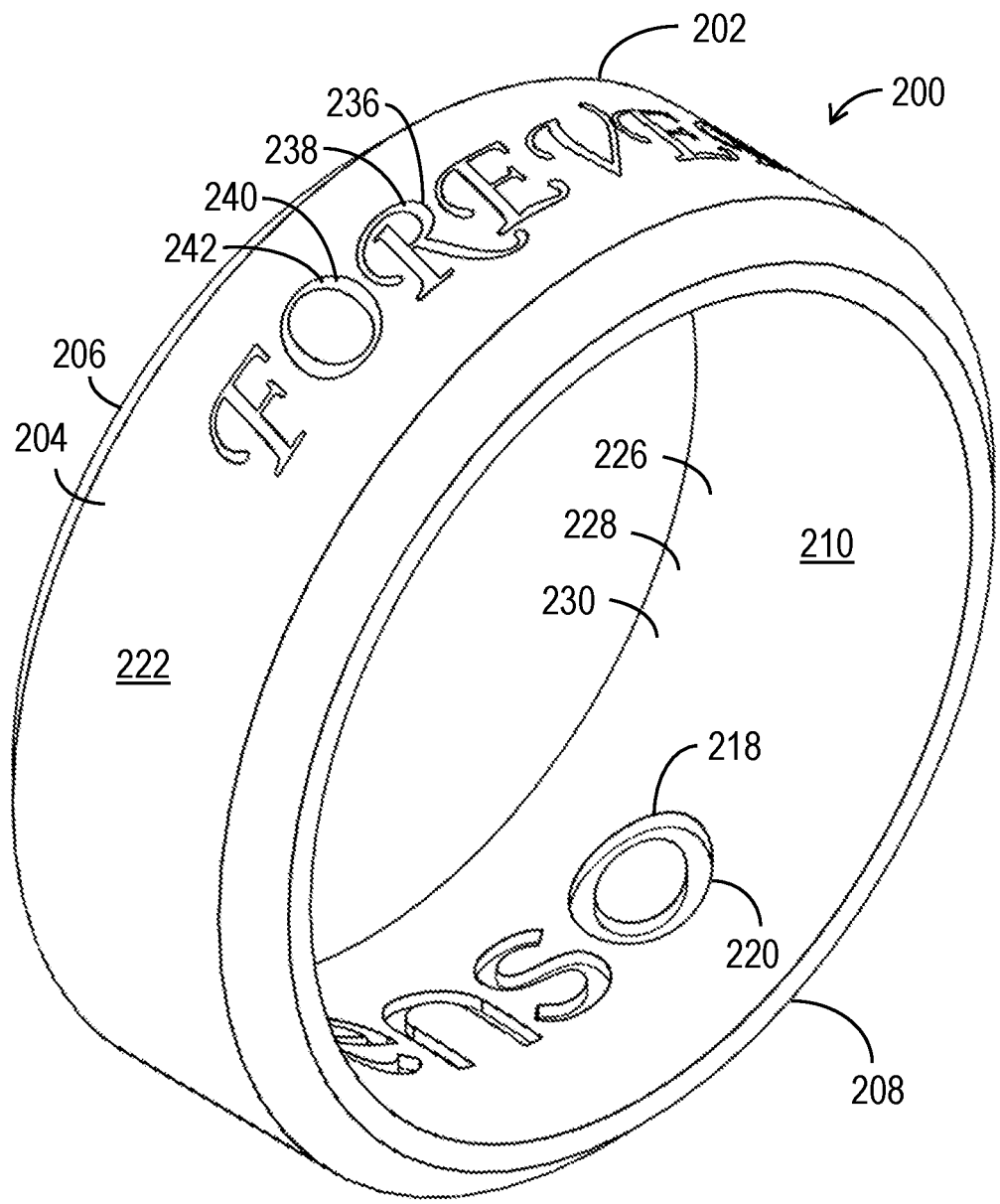
FIG. 16 is a front-bottom view of another implementation of a multicolored flexible wearable.
Figure 17:
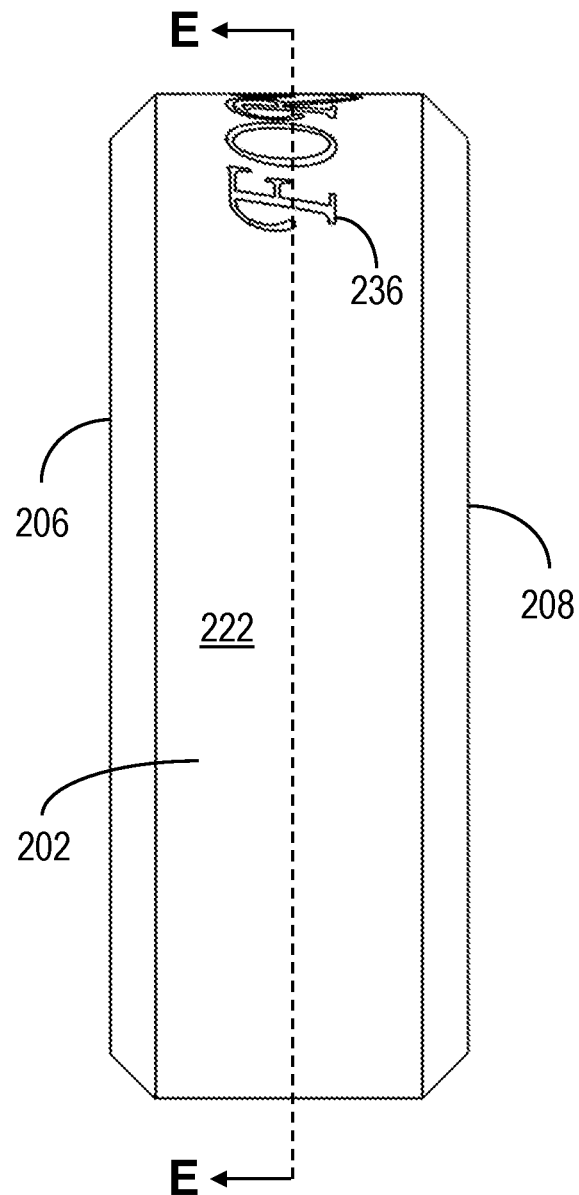
FIG. 17 is a front view of the multicolored flexible wearable of FIG. 16.
Figure 18:
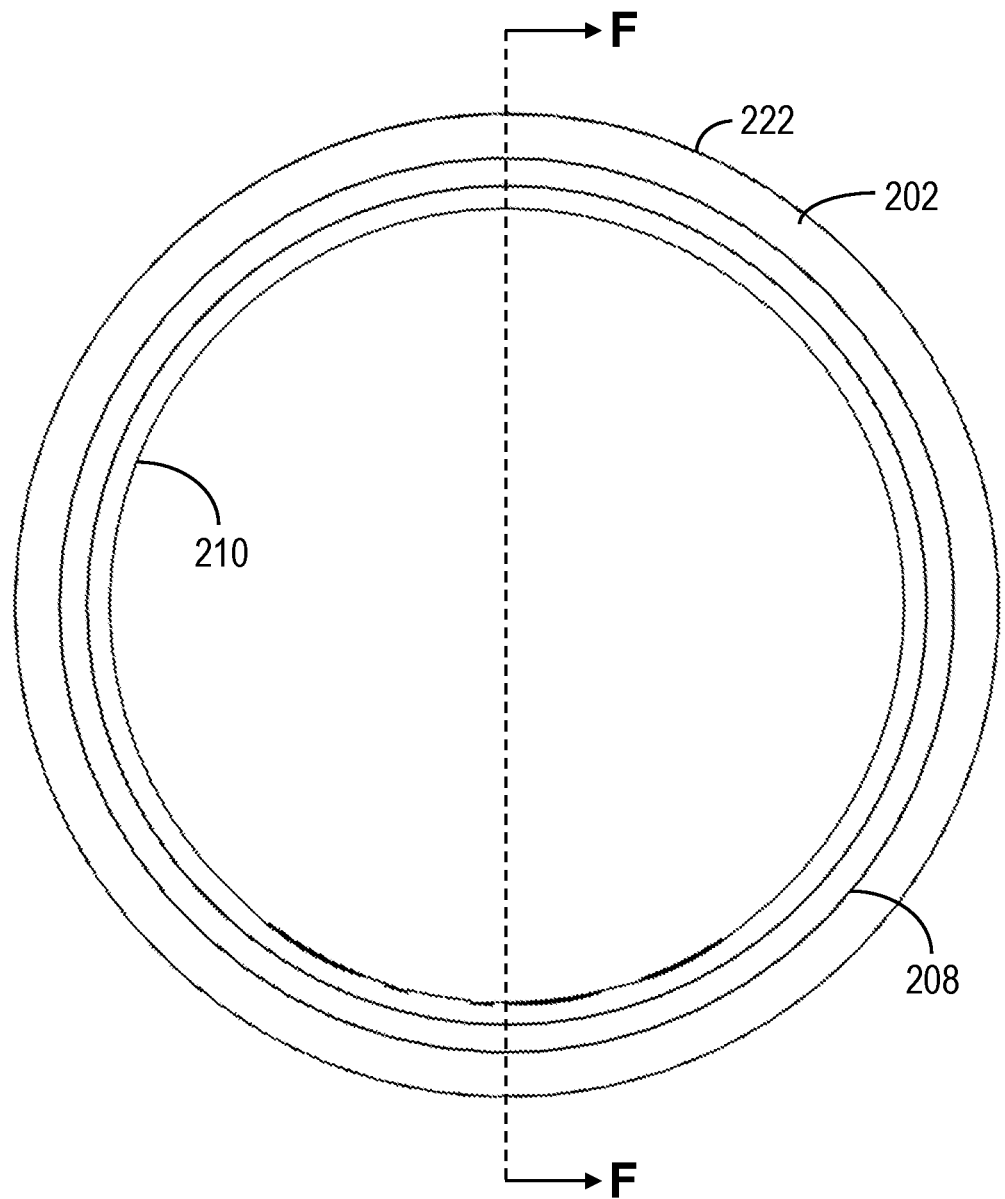
FIG. 18 is a bottom view of the multicolored flexible wearable of FIG. 16.

FIGS. 11-15 show that the wearable has a top 106 and a bottom 108. On the inner surface 110, grooves 112 are formed and generally extend from proximate the top to proximate the bottom of the wearable. FIG. 14 shows that the grooves do not fully extend from the top to the bottom of the ring, but generally reach near to the top of the wearable and near to the bottom of the wearable, and it may be said that the grooves extend 70-90% of the distance between the top and the bottom of the wearable, with each groove being centered between the top and bottom of the wearable.

The grooves are substantially parallel with an axis of rotation of the toroid. From FIG. 14 it may be seen that the inner surface 110 has some curvature, so that the grooves are not fully perfectly parallel with the axis of rotation of the toroid. Nevertheless, in the implementation shown each portion of each groove is within 10 degrees of being perfectly parallel with the axis of rotation of the toroid, and in implementations "substantially parallel" as applied between the grooves and the axis of rotation of the toroid means that each portion of each groove is within at least 20 degrees of perfect parallelism with the axis of rotation.

The grooves are useful for the same reasons that grooves described above with respect to other rings/wearables are useful. They may be useful, for example, for allowing moisture and dirt and the like to exit from between the user's digit/limb and wearable to outside the groove, so that the wearable does not trap moisture/sweat and dirt/contaminants between the wearable and the user's limb/digit. The departure of the grooves from perfect parallelism with the axis of rotation of the toroid, near the top and bottom of the wearable, in implementations may be useful to increase the removal of moisture and dirt/contaminants from between the wearable and the digit/limb, because the overall space between the groove and the digit/limb may be increased at the extremities (top and bottom) of each groove.

FIGS. 11-15 show that there are multiple grooves 112, including a first groove 114 and a second groove 116 and several grooves 112 between the first groove and the second groove (going the long way along the inner surface between the first groove and the second groove). Each groove 112 apart from the first and second groove is equidistant from its two nearest neighboring grooves. No imaginary line drawn on the inner surface from the first groove to the second groove and intersecting all other grooves in between could span a distance less than 70-80% of the full circumference of a circle defined by the inner surface. In the implementation shown a line drawn on the inner surface from the first groove to the second groove and intersecting all other grooves in between would span 270 degrees, or 75%, of the full circumference of a circle defined by the inner surface. Having the grooves equally spaced, generally, helps to increase the efficiency of moisture and dirt removal of each groove, and there are other advantages to the number of grooves, the spacing of the grooves, etc., as described above for other wearables/rings.

FIGS. 11-15 show that the wearable includes an image 118 on the inner surface 110, which in the implementation shown is an inscription 120 forming the word "enso." The inscription includes four recessed alphanumeric characters, in this case letters. The inscription and/or the image could include various other properties/characteristics as are described above for other images/inscriptions and could include numbers, non-alphanumeric symbols, and so forth. Additionally, the outer surface 122 and/or the top and/or bottom of the wearable could include one or more images/inscriptions, and the image/inscription shown on the inner surface is only a representative example.

FIGS. 11-15 show that the first portion 102 (and in this case the toroid 104 and the flexible material 126) includes a recess 124 in the outer surface 122. This recess is used for the placement of the second portion 136. Recess 124 (along with any other recesses or raised portions) could be formed by the molding process that forms the first portion. The second portion is formed of a flexible material 138 which may be, by non-limiting example, any of the flexible polymers described in this disclosure for other wearables and rings, having any of the material properties/characteristics, mechanical properties/characteristics, and other properties/characteristics described herein for those flexible polymers. In the implementation shown in the drawings the flexible material 138 is silicone and has similar material, mechanical, and other properties as described above for silicone rings.

Figure 12:
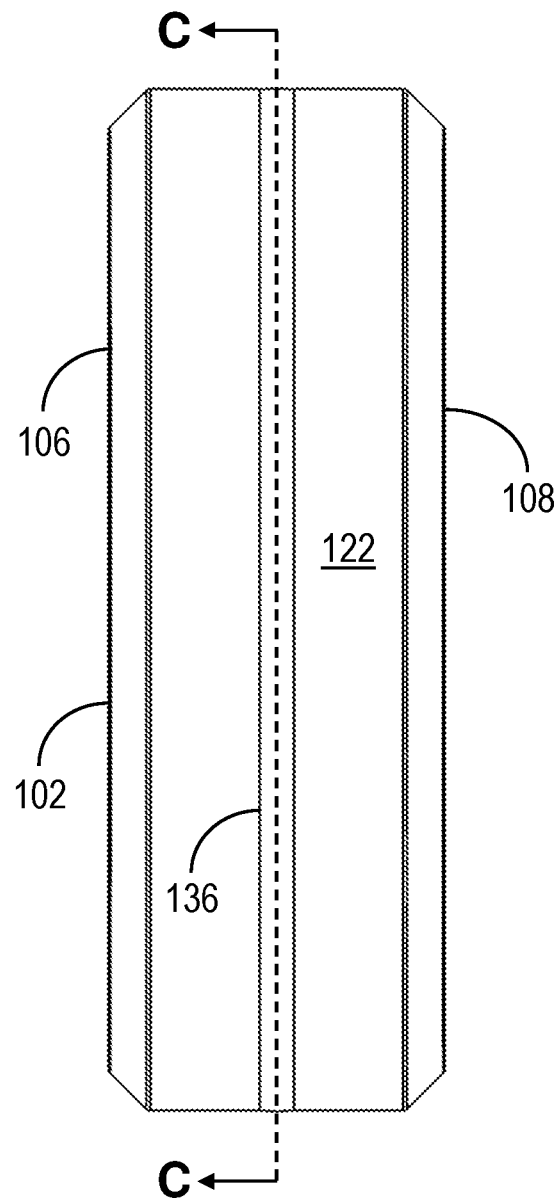
FIG. 12 is a front view of the multicolored flexible wearable of FIG. 11, the rear, right side, and left side views being mirror images.
Figure 13:
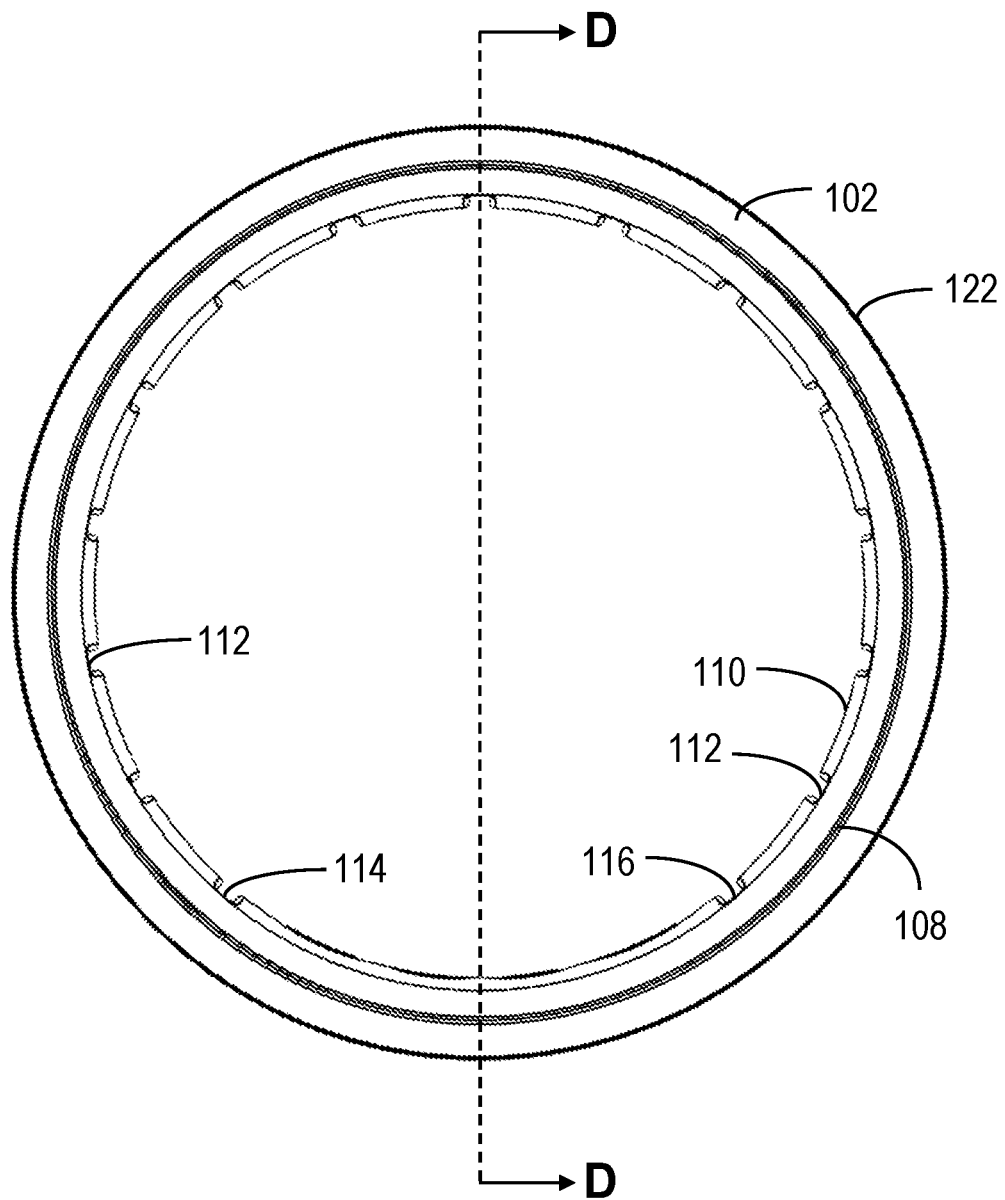
FIG. 13 is a bottom view of the multicolored flexible wearable of FIG. 11.

As shown in the drawings, the second portion 136 at least partially fills the recess of the first portion. In FIG. 12 it is seen that the second portion actually bulges slightly above the outer surface of the first portion and, accordingly, fully fills the recess of the first portion. In other implementations the second portion could fill at least a majority of the recess. Described in other terms, the second portion could fill at least a majority of a volume of the recess. Additionally, the recess is seen to have a depth perpendicular to the outer surface of the first portion, and in implementations the second portion fills at least a majority of the depth of the recess. The second portion may, in implementations, "substantially fill" the recess. In this context, "substantially fill" means that the second portion fills at least 70-100% of the volume of the recess. In implementations the second portion may fill at least: 50%, 55%, 60%, 65%, 70%, 75%, 80%, 85%, 90%, 95%, or 100% of the volume of the recess.

As indicated, in FIG. 12 it is shown that the second portion bulges slightly above the outer surface of the first portion. In other implementations the second portion could have a surface that is flush with the outer surface of the first portion. In still other implementations the second portion could have a surface closest to the outer surface of the first portion that resides below the outer surface of the first portion. In implementations the second portion could have a surface that is substantially flush with the outer surface of the first portion. In this context "substantially flush" means that 80% of the surface of the second portion is within 2 mm above or below the plane of the outer surface of the first portion. Having surfaces that are flush, or substantially flush, can result in an aesthetically pleasing feel and look to the wearable. Having surfaces that are not perfectly flush, but wherein the surface of the second portion rises slightly above the outer surface of the first portion, or sits slightly below the outer surface of the first portion, may also provide an aesthetically pleasing feel and look for some users. Having surfaces that are flush, or having the surface of the second portion slightly above the outer surface of the first portion, ensures that the recess is completely filled so that no moisture, dirt, grime, etc., can enter therein.

Some prior art rings use a silicone-based ink to provide a different color applied to a ring, and in some prior art rings a silicone-based ink may be applied within (or wiped into) debossed text or a recessed logo or the like and a wiping action (possibly the same wiping action as above) may be used to remove excess silicone ink from the raised or upper surfaces. In such implementations, the silicone-based ink presumably has a different composition and viscosity/durometer relative to the ring itself.

In the implementations of wearables shown in the drawings the flexible material 126 and flexible material 138 actually have the same composition except for one or more different colorants and one or more different precious material particles. This has the advantage of providing a greater bond between the second portion and first portion. Silicone-based inks, for example, may be more prone to decouple from a wearable/ring with use, but the second portion and first portion may have a strong bond between them due to the fact that, in some implementations, they have very similar material compositions and can more easily/readily bond together during a curing process. This reduces the likelihood of the second portion decoupling from the first portion even with long term and rugged use of the wearable.

Figure 20:
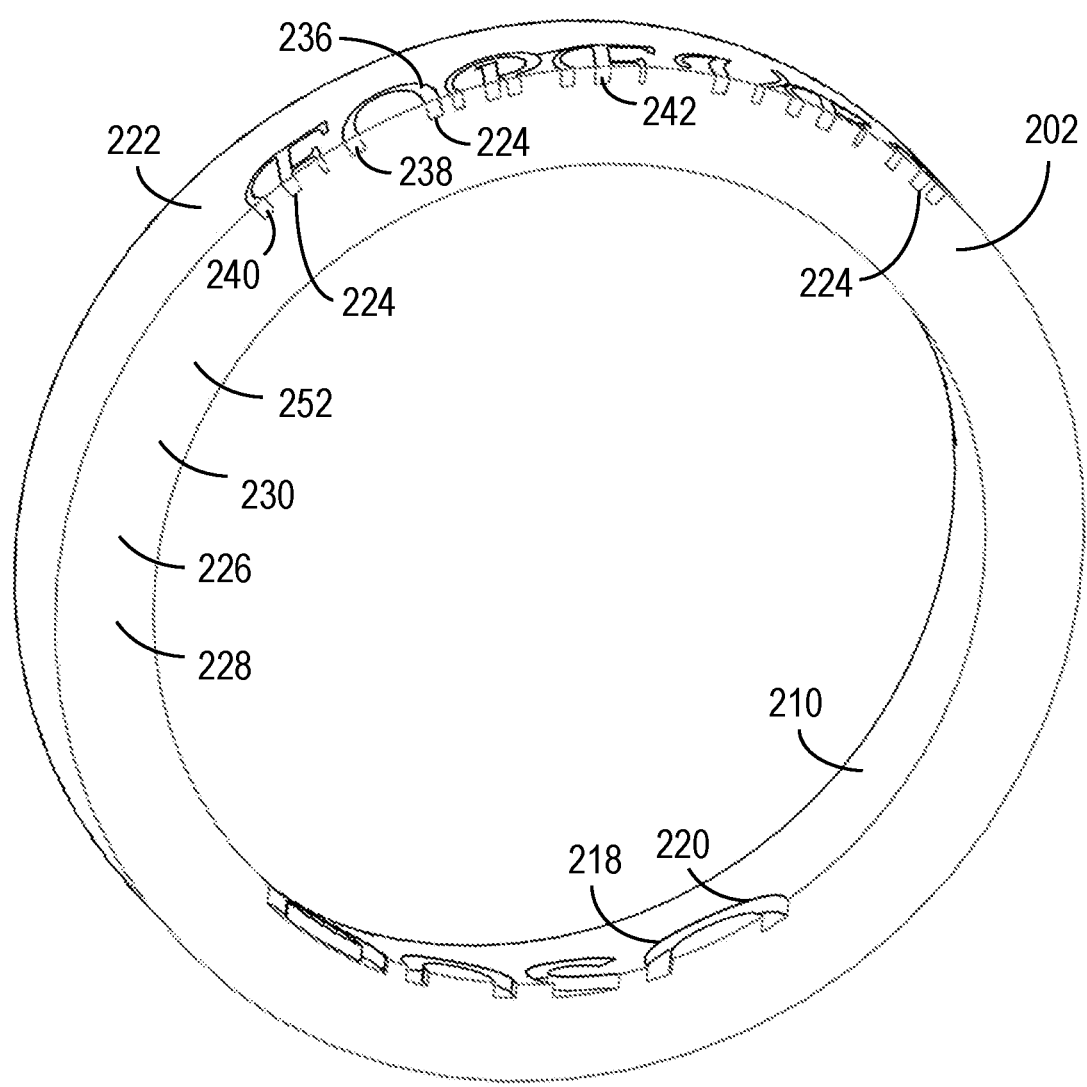
FIG. 20 is a front-bottom cross-section view of the multicolored flexible wearable of FIG. 17 taken along line E-E.

In implementations it may also be easier to form the second portion flush or substantially flush with the outer surface of the first portion due to the second portion (in liquid, non-cured form) having a higher viscosity relative to a silicone ink. The liquid, non-cured second portion may be placed in the recess, flush or substantially flush with the outer surface of the first portion, and quickly cured before the second portion has time to flow away from the substantially flush configuration, due to its high viscosity relative to a silicone ink. This, in implementations, may not be feasible with silicone inks, which in the prior art are used to color a surface of a ring or color the bottom surface of a recess, but not to substantially fill a recess of a ring or bracelet. For example, as indicated above, the second portion 136 has a thickness that is 16% of the total thickness of the first portion. In the wearable of FIG. 20, which will be described later, the second portion 236 has a thickness that is nearly 18% of the total thickness of the first portion 202. Such thicknesses/percentages are not generally feasible with silicone inks because, due to their low viscosity, they tend to flow more easily and could not be deposited in such great thicknesses and fully cured before they flow away from a substantially flush configuration.

Some prior art multicolored rings are formed by two or more molding steps, such as by molding a first portion and then overmolding a second portion having a different color. For example, some prior art rings include a central portion of one color coupled between two outer portions of another color, the two outer portions being overmolded after the central portion is molded.

In some multicolored prior art rings a recess or opening is created (either during molding or afterwards using a material removal process) which exposes one of the ring portions through the other ring portion, so that the color of one ring portion is visible through a recess or opening of the other ring portion. Such methods require two molding steps—one for molding the first colored portion and another for molding the second colored portion, and some such methods require material removal steps/methods after curing. Some wearables and methods disclosed herein, on the other hand, are useful in that they are manufactured more efficiently—they do not require a second molding step, and they do not require a material removal step after curing. Some wearables disclosed herein can accordingly be manufactured more quickly and efficiently than prior art versions. Some wearables disclosed herein, however, even though not requiring a second molding step, may not result in overall greater efficiency in manufacturing, but may result in a higher quality end product. Some wearables disclosed herein actually involve two molding steps and an additional step to combine the two molded portions together, which may not increase efficiency but may result in an increase in quality. For example, in testing, trying to fill a recess using an overmolding process (which would be more efficient than molding the components separately and then combining them) resulted in the second portion flashing and contaminating the first portion.

Referring back to FIGS. 11-15, although the recess is shown in the outer portion of the wearable, in other implementations there could alternatively or additionally be a recess in the inner surface and/or in the top and/or in the bottom of the wearable which could be at least partially filled with a second portion. Additionally, it is seen that the recess does not extend all the way from the outer surface of the wearable to the inner surface of the wearable (in the implementation shown it only extends about 10-20% of the distance from the outer surface to the inner surface, as seen in the cross section 150 of FIG. 14 and in the circular cross section 152 of FIG. 15). In FIG. 14 the recess extends 16% of the distance from the outer surface to the inner surface. In implementations this is useful because less of the second flexible material is needed and, additionally, it may make it easier to bond the second flexible material with the first flexible material without a more complex procedure that could require a mold. It also creates an aesthetically pleasing look whereby the second portion, which may have a different color than the first portion, may be able to be visible on any surface of the wearable without needing to be visible on the opposite surface of the wearable, so that it adds more flexibility to artistic designs, lettering, customization, etc., that may be implemented on any given wearable.

The first portion may include one or more precious material particles 128. The precious material particles may include one or more of gold particles, non-ionic silver particles, copper particles, platinum particles, and/or pearl particles. The first portion further may include one or more colorants 130. In implementations the precious material particles may be excluded from the first portion, and colorants could similarly be excluded from the first portion. Nevertheless, including one or both allows for tailoring the first portion to have specific colors and may increase the financial value (or subjective value from the perspective of the user) of the wearable. Additionally, in implementations in which both precious material particles and one or more colorants are included in the first portion, in implementations the one or more colorants may have a color matching a color of the precious material particles. For example, gold particles could be included in the first portion and the colorants added to the first portion may have a gold color. It is pointed out that the colorant may be entirely separate from the precious material particles in the sense that the first portion may have colorants, and it may have precious material particles, and the precious material particles are not the colorants. As is evident, the one or more colorants of the first portion may have a metallic color.

In implementations the flexible material 138 of the second portion also includes precious material particles 140 and one or more colorants 142. In implementations the precious material particles may be excluded from the second portion, and colorants could similarly be excluded from the second portion. Nevertheless, including one or both allows for tailoring the second portion to have specific colors and may increase the financial value (or subjective value from the perspective of the user) of the wearable. Additionally, in implementations in which both precious material particles and one or more colorants are included in the second portion, in implementations the one or more colorants may have a color matching a color of the precious material particles. For example, platinum particles could be included in the second portion and the colorants added to the second portion may have a platinum color. It is pointed out that the colorant may be entirely separate from the precious material particles in the sense that the second portion may have colorants, and it may have precious material particles, and the precious material particles are not the colorants. As is evident, the one or more colorants of the second portion may have a metallic color.

The drawings do not show antimicrobial elements in the wearable 100, but in implementations wearable 100 could include antimicrobial elements similar to those shown for other wearables/rings herein, which could be included in either the first portion, or second portion, or both. In implementations the wearable 100 may exclude antimicrobial elements entirely, though it is possible that in some implementations the precious material particles, depending on their composition, may provide some antimicrobial effect.

Referring now to FIGS. 16-20, a multicolored flexible wearable (wearable) 200 is shown which is, in many ways, similar to wearable 100, except that it excludes grooves and its recess(es) and second portion(s) are formed into corresponding letters. The recess(es) and second portion(s) could, alternatively, be formed into any alphanumeric characters, any shape(s), any non-alphanumeric design(s), and so forth. In any case, the recesses and the second portion may have corresponding shapes, alphanumeric characters or otherwise.

The wearable 200 is seen to have a first portion 202 which forms or includes/comprises a toroid 204 and has a top 206, bottom 208, inner surface 210, and an outer surface 222 opposite the inner surface. The first portion 202 is formed of a flexible material 226 which may have any of the characteristics of the flexible material 126, and in the implementation shown is silicone. The inner surface 210 is seen to have an image 218, which in this implementation is an inscription 220 of the word "enso," and the outer surface 222 is seen to have a plurality of recesses 224 each forming one letter in the shown implementation. In other implementations a plurality of letters could be connected so that a single recess includes all the letters, or some letters/characters could have non-connected elements so that multiple recesses are used for some individual letters/characters (for example this may be the case with the lowercase letter "i" but may also be the case with other letters depending on the font style).

Figure 19:
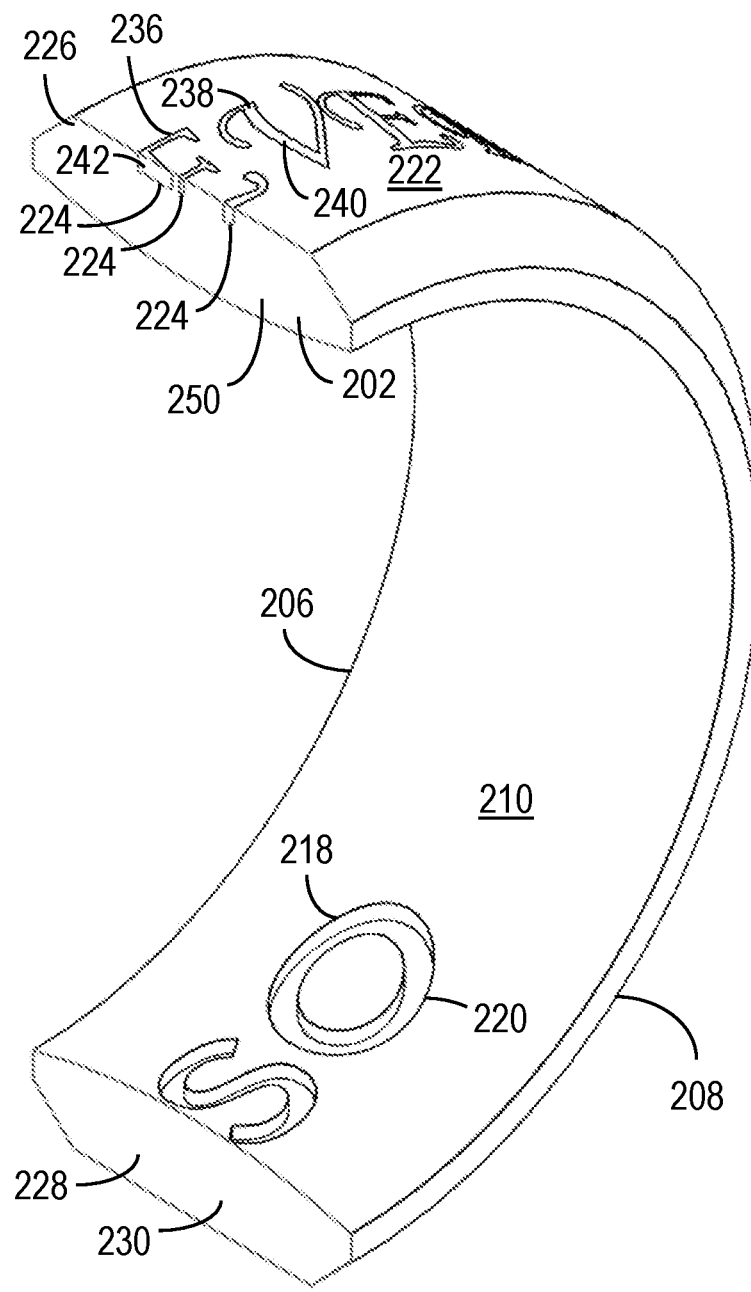
FIG. 19 is a front-bottom cross-section view of the multicolored flexible wearable of FIG. 18 taken along line F-F.

Wearable 200 is seen in FIGS. 19-20 to be configured so that the second portion 236 has a surface that is flush with the outer surface 222. This is in slight contrast to the second portion 136 of FIG. 12 which is seen to bulge slightly above the outer surface 122. This distinction merely shows that various configurations are possible for the second portion relative to the outer surface of the first portion, as has been described above with respect to whether the two are flush, or substantially flush, or otherwise.

The first portion may include precious material particles 228 and/or one or more colorants 230. The second portion 236 is formed of a flexible material 238 which may have any of the characteristics of the flexible material 138, and in the implementation shown is silicone. The second portion may include precious material particles 240 and/or one or more colorants 242. The relative sizes/thicknesses of the first and second portions are seen in the cross section 250 and the circular cross-section 252. Antimicrobial elements are not shown in the wearable 200, but could be included in either the first portion, or second portion, or both, or they may be excluded, though any included precious material particles may provide some antimicrobial effect depending on their composition.

Due to the fact that the first portions and second portions of the wearables 100 and 200 are formed in different steps, they may include different colors/colorants to form a multicolored flexible wearable. In some implementations neither portion includes precious material particles and the colors could be non-metallic colors. In some implementations either the first portion or second portion, or both, may have a metallic color, but without either the first or second portions including precious material particles. In some implementations both the first portion and the second portion have a metallic color, but separate metallic colors—for example a gold first portion and a silver second portion.

In implementations in which precious material particles are included in the first or second portion, there may or may not be a matching colorant in one of the portions. One of the portions may include precious material particles with the other portion including no precious material particles and with neither including a colorant matching the precious material particles. In cases where there are colorants matching the precious material particles, they may be in the same portion including the precious material particles or in the other portion, or both. For example only one portion could include precious material particles and either that portion, or the other portion, or both, could include a colorant matching a color of the precious material particles. In some cases both portions could include precious material particles of the same type. In other cases both portions could include precious material particles, but of different types. For example one portion could include gold particles and a gold colorant, while the other portion includes silver particles and a silver colorant. Due to the flexibility of which portion(s) include(s) precious material particles, of which type, and which portion(s) include(s) one or more colorants either matching any of the precious material particles of either portion, or not, various types of configurations are possible.

Similarly, neither portion is limited to just one type of precious material particle and/or one colorant matching the precious material particles. As a non-limiting example, one portion could include both copper and gold particles and could also include both copper and gold colorants. Or, as another example, the first and second portions could both include copper particles and gold particles, but one portion could include a copper colorant while the other portion includes a gold colorant. Many configurations are possible. If either portion has precious material particles, it is possible that in the bonding process to bond the first and second portions some of the precious material particles will transfer to the other portion so that the precious material particles are not exclusively in only one portion.

Example methods of manufacture of the multicolored flexible wearables will now be described. The first portion may be made using methods that are already common in the art, which include for example molding the flexible polymer in a mold and using a curing process (such as heat curing) to cure the flexible polymer. Silicone can cure at temperatures as low as 200 degrees Fahrenheit (F), and the first portions may be made in molds that include many first portions for efficiency. In such molds a 200 F cure cycle may take around 8-10 mins to fully cure the first portion(s).

Applying the second portion to the first portion, within the recess, may be done in one of a few ways. One method is to apply the second portion in liquid form, such as by depositing or dosing the liquid polymer into the recess(es) of the first portion. This process could be automated by placing multiple first portions on a mandrel and having a single dispenser element (or multiple aligned dispenser elements) which dispenses the liquid second portion into the recesses of the first portions.

In implementations a squeegee or cleaning step could then be used to wipe excess liquid off of the first portions. A polymer or metallic knife-like element or squeegee-like element could be used for this purpose. As opposed to a squeegee-like element or knife-like element, a cloth or fabric-like element could be used for this purpose, and in either case this step may be used not only to wipe away excess material but also to smear the liquid into all portions of the recesses of the first portions so that there are no unfilled portions or voids within the recesses. In some cases the liquid could simply be applied along the outer surfaces of the first portions (not necessarily only within the recesses) and the squeegee or cleaning process could both move the liquid fully into the recesses to fully fill them and also remove excess liquid from the first portions. The step of smearing the liquid and/or removing excess liquid, in implementations, could be automated by rotating the mandrel relative to the knife/squeegee/cloth-like element, or moving the knife/squeegee/cloth-like element relative to the mandrel, as non-limiting examples.

After the liquid has filled the recesses and any excess has been removed, heat may be applied to cure the second portion. This could be done, for example, with a heat gun. In experiments a heat gun set to a setting of 1000 F (but based on the distance from the wearable probably having an applied temperature of 500 F-800 F) cured second portions in about 10-20 seconds. Alternatively, the mandrel of first portions and deposited liquid second portions may be placed in an oven set to 200 F and may be cured, which curing process is expected to take about 2-3 minutes. Other temperatures and times could be used, of course, and in other implementations other curing mechanisms, such as chemical curing, ultraviolet (UV) curing, and so forth, could be used in some implementations depending on the materials involved.

Once the curing process is done, the first portion and second portion are permanently bonded together. In implementations in which the first portion and second portion are silicone, for example, the silicone of the second portion bonds with the silicone of the first portion during the curing step, so that the two are permanently joined.

In the process described above, any colorants and/or any precious material particles to be included in the second portion could be mixed into the liquid prior to dispensing it into the recesses. The liquid may be in a paste-like form due to its high viscosity.

Another method of fabrication could include molding and curing the first portion and molding and curing the second portion separately, then applying one or more layers of liquid polymer to the first portion within the recess and/or to the second portion, coupling the second portion with the first portion, and then a curing step. For example, in implementations in which the first portion and second portion are formed of silicone, after they are formed some liquid silicone of the same material or a substantially identical composition (or identical except for different or no colorants and/or different or no precious material particles relative to the first and second portions) could be applied to the bottom surface of the recess and/or the sidewalls of the recess and/or the underside of the second portion and/or the sidewalls of the second portion, then the second portion could be placed within the recess, and a curing step could be performed, permanently coupling together the first and second portions by bonding each with the liquid silicone that is cured in this curing step. The layer(s) of liquid silicone applied for bonding the first and second portions may in implementations be a very thin layer of silicone. In some implementations (such as with wearable 100) the second component may have to be stretched to get it to circumscribe the first portion and to get it situated in the recess, and in such implementations it may make sense to apply the liquid silicone within the recess, and not to the second portion directly, lest the liquid silicone get onto the outer surface of the first portion during this stretching and situating step.

The methods disclosed above may be used to fill in a recess of an already-made wearable. For example, a consumer could obtain a wearable from any source, and any of the methods above could be used by another party/source (or the same party/source) at some point thereafter to fill one or more recesses of the wearable to provide it with a modified look.

In implementations the compositions of the first and second portion may not be perfectly identical but may be substantially identical. "Substantially identical" in this context means that there is identicality between 70% or more of the weight or volume percentage of materials between the first and second compositions. For example, if the first composition comprises 90% silicone and 10% of one other component (by weight or volume), and the second composition comprises 70% silicone and then 1% of each of 30 other components (by weight or volume), based on the silicone percentages alone the composition of the second portion would be "substantially identical" to the composition of the first portion. This is because both compositions comprise 70% silicone and, accordingly, there is at least 70% identicality between the compositions. In other implementations the percentage of identicality between first and second portions could be, for example, at least: 60%, 65%, 70%, 75%, 80%, 85%, 90%, and/or 95%. In implementations the first and second portions and/or first and second flexible materials/polymers may have identical compositions except for one or more different colorants and/or one or more precious material particles (this could be met if neither included precious material particles but the two included different colorants, or if neither included colorants but the two included different precious material particles, or if one included precious material particles and the other didn't, or if one included precious material particles and the other included a different type of precious material particles, or if one included a colorant and the other included no colorant, etc.).

In implementations the first and second portions may not have substantially identical compositions. For example one of the portions could be made of a different durometer, and/or could have a higher precious material content, so that the compositions are not substantially identical. By non-limiting example, the second portion could be made of a higher durometer and a higher percentage of gold particles, so that it has closer to a metallic look and feel. Other variations are possible, and this is just one representative example. Nevertheless, implementations in which the first and second portions have substantially identical compositions may allow for better bonding between the first and second portions.

The colorants used in any of the examples given herein could be, by non-limiting examples, liquid colorants or powdered colorants.

With wearable 200 it may be seen that the outer surface 222 fully circumscribes an opening of each recess, whereas with wearable 100 the outer surface 122 borders an opening of the recess on either side but may not be said to fully circumscribe the opening. With wearable 100 the second portion circumscribes the first portion, whereas with wearable 200 this is not the case.

In places where the phrase "one of A and B" is used herein, including in the claims, wherein A and B are elements, the phrase shall have the meaning "A and/or B." This shall be extrapolated to as many elements as are recited in this manner, for example the phrase "one of A, B, and C" shall mean "A, B, and/or C," and so forth. To further clarify, the phrase "one of A, B, and C" would include implementations having: A only; B only; C only; A and B but not C; A and C but not B; B and C but not A; and A and B and C.

In places where the description above refers to specific implementations of multicolored flexible wearables and related methods, one or more or many modifications may be made without departing from the spirit and scope thereof. Details of any specific implementation/embodiment described herein may, wherever possible, be applied to any other specific implementation/embodiment described herein. The appended claims are to encompass within their scope all such changes and modifications as are within the true spirit and scope of this disclosure.

Furthermore, in the claims, if a specific number of an element is intended, such will be explicitly recited in the claim, and in the absence of such explicit recitation no such limitation exists. For example, the claims may include phrases such as "at least one" and "one or more" to introduce claim elements. The use of such phrases should not be construed to imply that the introduction of any other claim element by the indefinite article "a" or "an" limits that claim to only one such element, and the same holds true for the use in the claims of definite articles.

Additionally, in places where a claim below uses the term "first" as applied to an element, this does not imply that the claim requires a second (or more) of that element—if the claim does not explicitly recite a "second" of that element, the claim does not require a "second" of that element.

What is claimed is:

1. A multicolored flexible wearable, comprising:
a first portion comprising a toroid formed at least in part by a first flexible polymer, the first flexible polymer comprising:
one or more first colorants comprised within the first flexible polymer;
an exposed first outer surface;
an exposed second outer surface opposite the exposed first outer surface; and
a recess in the exposed first outer surface, the recess comprising a depth perpendicular to the exposed first outer surface, the recess not extending to the exposed second outer surface; and
a second portion filling at least a majority of a volume of the recess and at least a majority of the depth of the recess, the second portion comprising a second flexible polymer, the second flexible polymer comprising one or more second colorants comprised within the second flexible polymer;
wherein the first flexible polymer and the second flexible polymer are permanently bonded together within the recess;
wherein the first flexible polymer comprises a different color than the second flexible polymer; and
wherein the recess forms one of: one or more lines at least partially encircling the first portion; and one or more alphanumeric characters.

2. A multicolored flexible wearable, comprising:
a first portion comprising a toroid formed at least in part by a first flexible polymer, the first flexible polymer comprising:
one or more first colorants comprised within the first flexible polymer;
an exposed first outer surface;
an exposed second outer surface opposite the exposed first outer surface; and
a recess in the exposed first outer surface, the recess comprising a depth perpendicular to the exposed first outer surface, the recess not extending to the exposed second outer surface; and
a second portion filling at least a majority of a volume of the recess and at least a majority of the depth of the recess, the second portion comprising a second flexible polymer, the second flexible polymer comprising one or more second colorants comprised within the second flexible polymer;
wherein the first flexible polymer and the second flexible polymer are permanently bonded together within the recess;
wherein the first flexible polymer comprises a different color than the second flexible polymer; and
wherein the second portion comprises a surface most proximate to the exposed first outer surface and pointing in a same direction as the exposed first outer surface which is not substantially flush with the exposed first outer surface.

3. A multicolored flexible wearable, comprising:
a first portion comprising a toroid formed at least in part by a first flexible polymer, the first flexible polymer comprising:
one or more first colorants comprised within the first flexible polymer;
an exposed first outer surface;
an exposed second outer surface opposite the exposed first outer surface; and
a recess in the exposed first outer surface, the recess comprising a depth perpendicular to the exposed first outer surface, the recess not extending to the exposed second outer surface;
a second portion filling at least a majority of a volume of the recess and at least a majority of the depth of the recess, the second portion comprising a second flexible polymer, the second flexible polymer comprising one or more second colorants comprised within the second flexible polymer; and
a plurality of straight grooves formed in the exposed second outer surface and extending from proximate a top of the first portion to proximate a bottom of the first portion;
wherein the first flexible polymer and the second flexible polymer are permanently bonded together within the recess; and
wherein the first flexible polymer comprises a different color than the second flexible polymer.

4. A method of forming a multicolored flexible wearable, comprising:
forming a toroid comprising a first portion, the first portion comprising a first flexible polymer, the first flexible polymer comprising one or more first colorants;
forming a recess in an exposed first outer surface of the toroid, the recess comprising a depth perpendicular to the exposed first outer surface of the toroid, the recess not extending fully to an exposed second outer surface of the toroid opposite the exposed first outer surface;
filling at least a majority of a volume of the recess and at least a majority of the depth of the recess with a second portion, the second portion comprising a second flexible polymer, the second flexible polymer comprising one or more second colorants; and
permanently bonding the first portion and the second portion together through a curing process;
wherein the first flexible polymer comprises a different color than the second flexible polymer;
wherein the first portion and the second portion comprise at least 70% identicality between their compositions; and
wherein forming the recess in the exposed first outer surface comprises one of: forming one or more lines at least partially encircling the first portion; and forming one or more alphanumeric characters.

5. The method of claim 4, wherein forming the recess in the exposed first outer surface comprises forming the one or more alphanumeric characters.

* * * * *